US006850297B2

(12) United States Patent
Takizawa et al.

(10) Patent No.: US 6,850,297 B2
(45) Date of Patent: Feb. 1, 2005

(54) SUBSTRATE ASSEMBLY FOR ELECTROOPTICAL DEVICE, METHOD FOR MANUFACTURING SUBSTRATE ASSEMBLY FOR ELECTROOPTICAL DEVICE, ELECTROOPTICAL DEVICE, METHOD FOR MANUFACTURING ELECTROOPTICAL DEVICE, AND ELECTRONIC APPARATUS

(75) Inventors: Keiji Takizawa, Hotaka-machi (JP); Yoshihiro Otagiri, Matsumoto (JP)

(73) Assignee: Seiko Epson Corporation (JP)

( * ) Notice: Subject to any disclaimer, the term of this patent is extended or adjusted under 35 U.S.C. 154(b) by 40 days.

(21) Appl. No.: 10/206,139

(22) Filed: Jul. 26, 2002

(65) Prior Publication Data

US 2003/0020863 A1 Jan. 30, 2003

(30) Foreign Application Priority Data

Jul. 27, 2001 (JP) ........................................ 2001-228448
Jun. 27, 2002 (JP) ........................................ 2002-188599

(51) Int. Cl.[7] ............................................. G02F 1/1335
(52) U.S. Cl. ...................... 349/114; 349/113; 349/106; 349/122
(58) Field of Search ........................... 349/67, 113–115, 349/122, 139, 160, 106

(56) References Cited

U.S. PATENT DOCUMENTS

| 6,281,952 B1 | * | 8/2001 | Okamoto et al. | ............. | 349/12 |
| 6,285,426 B1 | * | 9/2001 | Akins et al. | ................ | 349/114 |
| 6,380,995 B1 | * | 4/2002 | Kim | ........................... | 349/113 |
| 6,532,045 B2 | | 3/2003 | Chung et al. | | |
| 6,620,655 B2 | * | 9/2003 | Ha et al. | ..................... | 438/149 |
| 6,621,542 B1 | * | 9/2003 | Aruga | ........................ | 349/113 |
| 6,690,438 B2 | * | 2/2004 | Sekiguchi | .................... | 349/114 |
| 6,697,138 B2 | | 2/2004 | Ha et al. | | |
| 2002/0093609 A1 | * | 7/2002 | Baek et al. | ................. | 349/113 |
| 2002/0135715 A1 | * | 9/2002 | Miwa et al. | ................ | 349/113 |

FOREIGN PATENT DOCUMENTS

| JP | 11-052366 | | 2/1999 | | |
| JP | 11-242226 | | 9/1999 | | |
| JP | 2000-267077 | | 9/2000 | | |
| JP | 2000-298271 | | 10/2000 | | |
| JP | 2000-305099 | | 11/2000 | | |
| JP | 2001-033778 | | 2/2001 | | |
| JP | 2001125085 A | * | 5/2001 | ......... | G02F/1/1333 |
| KR | 2001-0060817 | | 7/2001 | | |
| KR | 2002-0068765 | | 8/2002 | | |
| WO | WO 9953369 A1 | * | 10/1999 | ......... | G02F/1/1335 |

OTHER PUBLICATIONS

Communication from Korean Patent Office re: counterpart application.
Communication from Japanese Patent Office re: counterpart application.

* cited by examiner

Primary Examiner—Robert H. Kim
Assistant Examiner—Michael H Caley
(74) Attorney, Agent, or Firm—Harness, Dickey & Pierce, P.L.C.

(57) ABSTRACT

An optically transmissive layer 212 is formed on a first substrate 211, and a slope surface 212a having a valley in cross section is formed in the optically transmissive layer 212. A reflective layer 213 having a aperture 213h on the slope surface 212a is formed on the optically transmissive layer 212. A color layer 214 is formed on the reflective layer 213. The color layer 214 has a thick portion 214a formed corresponding to the slope surface 212a of the optically transmissive layer 212.

17 Claims, 14 Drawing Sheets

FIG. 3
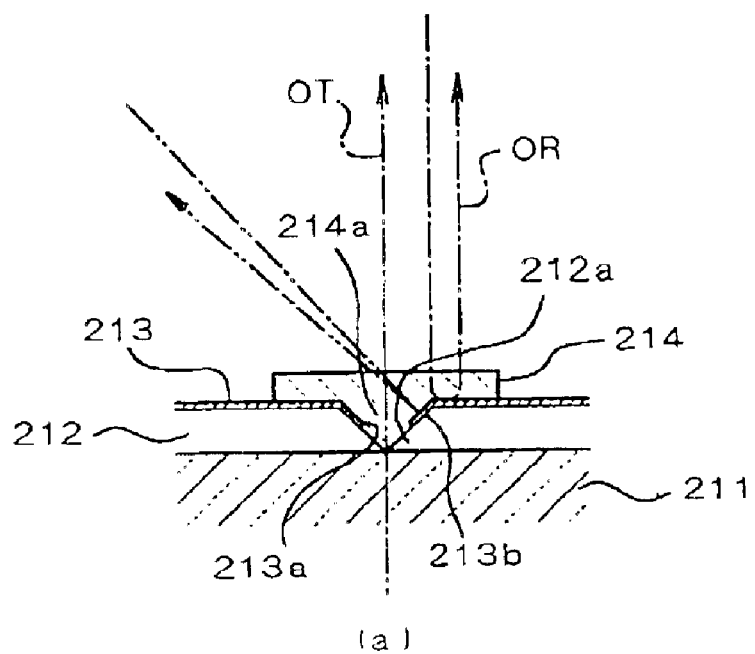
(a)
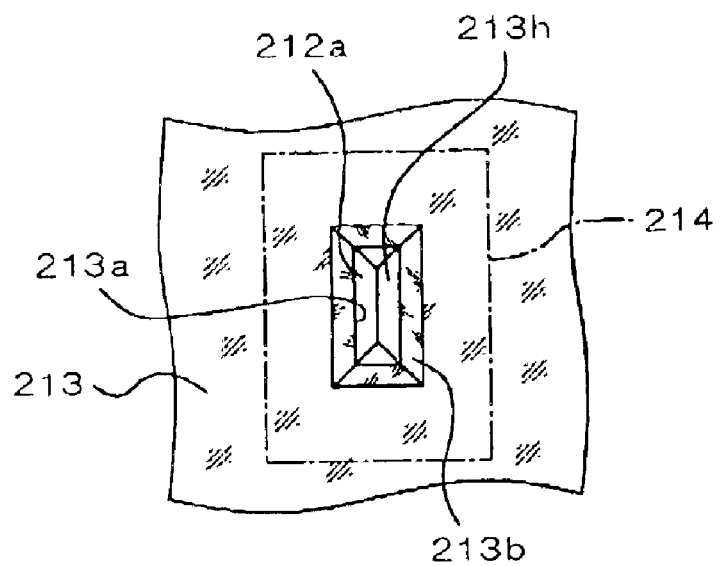
(b)

FIG. 7
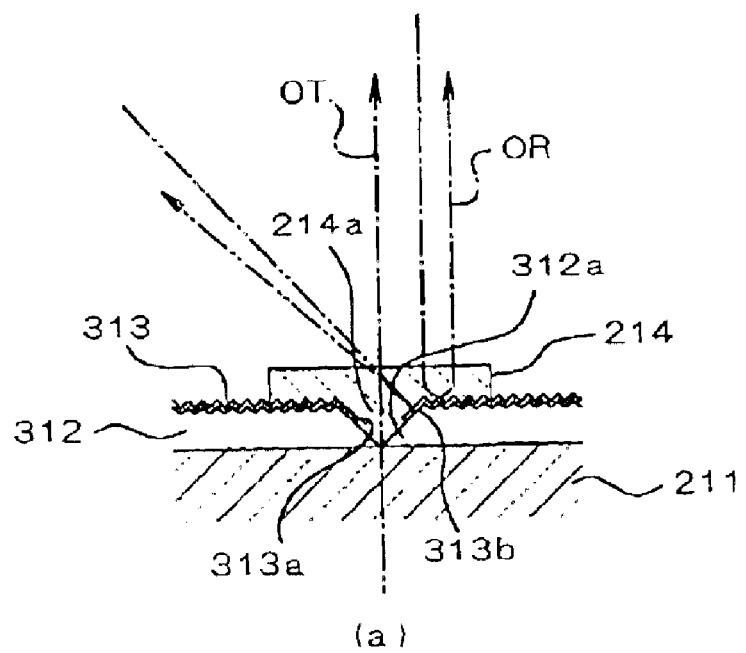
(a)
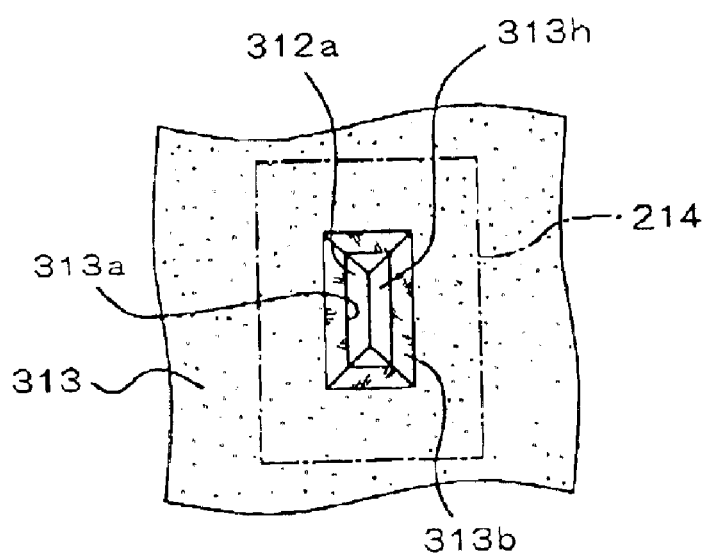
(b)

SUBSTRATE ASSEMBLY FOR ELECTROOPTICAL DEVICE, METHOD FOR MANUFACTURING SUBSTRATE ASSEMBLY FOR ELECTROOPTICAL DEVICE, ELECTROOPTICAL DEVICE, METHOD FOR MANUFACTURING ELECTROOPTICAL DEVICE, AND ELECTRONIC APPARATUS

BACKGROUND OF THE INVENTION

1. Technical Field of the Invention

The present invention relates to a substrate assembly for an electrooptical device, a method for manufacturing the substrate assembly for the electrooptical device, the electrooptical device, and a method for manufacturing the electrooptical device, and, more particularly, to a structure and a manufacturing process technology appropriate for a transflective-type liquid-crystal device.

2. Description of the Related Art

A transflective-type liquid-crystal display panel presenting both a reflective-type display using external light and a transmissive-type display using illumination light such as the one from a backlight is known. The transflective-type liquid-crystal display panel includes a reflective layer which reflects external light into the panel while transmitting illumination light from a backlight or the like. This type of reflective layer includes an aperture (a slit) having a predetermined area at each pixel of a liquid-crystal display panel.

FIG. 13 is a cross-sectional view diagrammatically illustrating a conventional transflective-type liquid-crystal display panel 100. The transflective-type liquid-crystal display panel 100 includes a substrate 101 and a substrate 102, which are mutually bonded together with a sealing member 103 interposed therebetween, and a liquid crystal 104 encapsulated between the substrate 101 and the substrate 102.

A reflective layer 111 having an aperture 111h for each pixel is arranged on the inner surface of the substrate 101. A color filter 112 formed of color layers 112r, 112g, and 112b and a surface protective layer 112p is arranged on the reflective layer 111. Transparent electrodes 113 are formed on the surface of the surface protective layer 112p of the color filter 112.

Meanwhile, transparent electrodes 121 are formed on the inner surface of the substrate 102 and mutually intersect the transparent electrodes 113 on the counter substrate 101. An alignment layer and a hard transparent layer are formed on each of the transparent electrodes 113 on the substrate 101 and the transparent electrodes 121 on the substrate 102, as necessary.

Arranged on the outer surface of the substrate 102 are a retardation film (¼-wave film) 105 and a polarizer 106 in that order from the substrate 102. Also arranged on the outer surface of the substrate 101 are a retardation film (¼-wave film) 107 and a polarizer 108 in that order from the substrate 101.

When being installed in electronic apparatus such as a mobile telephone or a mobile information terminal, the liquid-crystal display panel 100 thus constructed has a backlight 109 mounted therebehind. In the liquid-crystal display panel 100 during daytime or in a room under light conditions, external light travels along a reflective path R, in other words, is transmitted through the liquid crystal 104, is reflected from the reflective layer 111, is transmitted through the liquid crystal 104 again, and exits outwardly. A reflective-type display is thus presented. During nighttime or under dark conditions outdoors, the backlight 109 is switched on. Light passed through the aperture 111h, out of illumination light from the backlight 109, travels along a transmissive path T, specifically, is transmitted through the liquid-crystal display panel 100, and then exits outwardly. A transmissive-type display is thus presented.

However, in the conventional transflective-type liquid-crystal display panel 100, light is transmitted through the color filter 112 twice along the reflective path R. In the transmissive path T, light is transmitted through the color filter 112 only once. The chroma in the transmissive-type display becomes inferior to that in the reflective display. Specifically, the reflective-type display typically tends to suffer from the lack of brightness. To assure brightness in the display, the light transmittance of the color filter 112 needs to be high. A high light transmittance in the transmissive display means insufficient chroma.

Since the number of times by which light is transmitted through the color filter is different between the reflective-type display and the transmissive-type display, the chroma in the transmissive-type display is substantially different from that in the reflective-type display. As a result, the user may feel odd about color tone.

The present invention resolves the above problem, and it is an object of the present invention to provide a color filter which assures both the brightness in the reflective-type display and the chroma in the transmissive-type display when a display device that presents both the transmissive-type display and the reflective-type display. It is another object of the present invention to provide an electrooptical device which assures both the brightness in the reflective-type display and the chroma in the transmissive-type display. It is yet another object to develop a display technique that reduces a difference in chroma between the reflective-type display and the transmissive-type display.

SUMMARY OF THE INVENTION

To resolve the above problem, a substrate assembly of the present invention for an electrooptical device includes a substrate, an optically transmissive layer which, arranged on the substrate, has a slope surface inclined with respect to the substrate, and substantially transmits light, a reflective layer, arranged on the optically transmissive layer, and having an aperture, wherein the edge of the aperture is placed on the slope surface.

In accordance with the present invention, the edge of the aperture of the reflective layer is placed on the slope surface in the electrooptical device. The angle of reflection of reflected light is increased, and an viewing angle of the reflective-type display is thus increased. In comparison with the case in which a step is formed around the aperture, a patterning operation of the reflective layer is performed easily and precisely.

In the substrate assembly of the present invention, the optically transmissive layer preferably includes a valley portion formed of the slope surface.

In accordance with the present invention, the slope surface forming the valley portion is aligned in multiple directions, and the angle of reflection of external light is widened further. With the substrate assembly incorporated in the electrooptical device, the viewing angle characteristics of the reflective-type display in the electrooptical device are improved.

A substrate assembly for an electrooptical device, includes a substrate, an optically transmissive layer which, arranged on the substrate, has an aperture, and substantially transmits light, a reflective layer having an aperture overlapping the aperture of the optically transmissive layer, wherein the optically transmissive layer has a slope surface, inclined with respect to the substrate, around the aperture thereof and wherein the edge of the aperture of the reflective layer is placed on the slope surface or within the aperture of the optically transmissive layer on the inside of the slope surface.

In accordance with the present invention, the edge of the aperture of the reflective layer is placed on the slope surface or within the aperture of the optically transmissive layer on the inside of the slope surface in the electrooptical device. The angle of reflection of the reflected light is increased. The viewing angle of the reflective-type display is thus increased. The dependence of the reflective-type display on the viewing angle is thus improved. In comparison with the case in which a step is formed around the aperture, a patterning operation of the reflective layer is performed easily and precisely.

In the substrate assembly of this invention, the reflective layer preferably includes a reflective slope surface inclined with respect to the substrate, and the reflective slope surface is arranged at least on the slope surface of the optically transmissive layer.

In accordance with the present invention, the range of angle of reflection of the reflected light is increased by the reflective slope surface, and the viewing angle of the reflective-type display is widened.

Preferably, the optically transmissive layer includes a surface parallel with the substrate, and the reflective slope surface of the reflective layer extends over the slope surface of the optically transmissive layer from the parallel surface thereof.

In accordance with the present invention, the patterning of the reflective layer is easy because the reflective slope surface is integrally formed with the flat reflective surface.

In this invention, preferably, the reflective layer includes a finely rugged portion for scattering visible light.

In accordance with the present invention, the electrooptical device incorporating the substrate assembly prevents a view behind a user and an image of external illumination light from being reflected in the reflective-type display.

The substrate assembly of the present invention preferably further includes a color layer arranged on the optically transmissive layer.

In accordance with the present invention, the color layer has a thick portion that is stacked on the aperture of the reflective layer corresponding to the slope surface and the aperture of the optically transmissive layer in plan view. Using the substrate assembly in the electrooptical device, the chroma in the transmissive-type display is heightened while the brightness of the reflective-type display is assured (not at the expense of the brightness in the reflective-type display). The material of the color layer easily fills in a manner such that the thick portion of the color layer is arranged on the slope surface of the optically transmissive layer, the reflective slope surface of the reflective layer, and within the aperture of the optically transmissive layer surrounded with the slope surface and the reflective slope surface. This arrangement improves the flatness of the surface of the color layer.

A substrate assembly of the present invention for an electrooptical device, includes a substrate, a reflective layer arranged on the substrate, and having an aperture, and an optically transmissive layer which, arranged on the reflective layer, has a slope surface inclined with respect to the substrate, and substantially transmits light, wherein the slope surface is placed over the edge of the aperture, and wherein the substrate assembly further includes a color layer on the optically transmissive layer.

In accordance with the present invention, at least a portion of the slope surface of the optically transmissive layer overlaps the aperture of the reflective layer. Since the color layer is arranged over the aperture, the color layer is thicker on the aperture than on the remaining portion thereof. Using the substrate assembly in the electrooptical device, the chroma in the transmissive-type display is heightened while the brightness of the reflective-type display is assured (not at the expense of the brightness in the reflective-type display). The material of the color layer easily fills in a manner such that the thick portion of the color layer is arranged on the slope surface of the optically transmissive layer, and the reflective slope surface of the reflective layer. This arrangement improves the flatness of the surface of the color layer.

Another substrate assembly of the present invention for an electrooptical device, includes a substrate, a reflective layer arranged on the substrate, and having an aperture, and an optically transmissive layer which, arranged on the reflective layer, has an aperture overlapping the aperture of the reflective layer, and substantially transmits light, wherein the optically transmissive layer includes a slope surface, inclined with respect to the substrate, around the aperture thereof, wherein the edge of the aperture of the reflective layer is placed on the slope surface or within the aperture of the optically transmissive layer on the inside of the slope surface, and wherein the substrate assembly includes a color layer on the optically transmissive layer.

In accordance with the present invention, the aperture of the optically transmissive layer overlaps the aperture of the reflective layer, and the slope surface is formed around the edge of each of the apertures. The color layer becomes thicker on the aperture and the slope surface of the optically transmissive layer than on the remaining portion thereof. Using the substrate assembly in the electrooptical device, the chroma in the transmissive-type display is heightened while the brightness of the reflective-type display is assured (not at the expense of the brightness in the reflective-type display). The material of the color layer easily fills in such a manner that the thick portion of the color layer is arranged on the slope surface of the optically transmissive layer, the reflective slope surface of the reflective layer, and within the aperture of the optically transmissive layer surrounded with the slope surface and the reflective slope surface. This arrangement improves the flatness of the surface of the color layer.

A method of the present invention for manufacturing a substrate assembly for an electrooptical device, includes a step of forming, on a substrate, an optically transmissive layer which substantially transmits light, a step of forming a slope surface, inclined with respect to the substrate, as a portion of the optically transmissive layer by causing the optically transmissive layer to become soft enough to flow, and a step of forming, on the optically transmissive layer, a reflective layer having an aperture, wherein the aperture is opened in the step of forming the reflective layer so that the edge of the aperture is placed on the slope surface.

In accordance with the present invention, the optically transmissive layer is softened, thereby forming the slope surface with the flowability thereof. The reflective layer is formed on the optically transmissive layer, and the aperture of the reflective layer is formed in the slope surface of the optically transmissive layer. When the color layer for the color filter is formed, the thick portion of the color layer is arranged on the aperture of the reflective layer. When the reflective layer on the slope surface is removed to form the aperture in the manufacturing process of the substrate, no large step takes place in the removed portion. The formation of the aperture is easy, and the aperture is opened with a high degree of accuracy.

Another method of the present invention for manufacturing a substrate assembly for an electrooptical device, includes a step of forming, on a substrate, an optically transmissive layer which substantially transmits light and has an aperture, a step of forming a slope surface, inclined with respect to the substrate, around the edge of the aperture by causing the optically transmissive layer to become soft enough to flow, and a step of forming, on the optically transmissive layer, a reflective layer having an aperture overlapping the aperture of the optically transmissive layer, wherein the aperture is formed in the reflective layer in the step of forming the reflective layer so that the edge of the aperture of the reflective layer is placed on the slope surface or within the aperture of the optically transmissive layer on the inside of the slope surface.

In accordance with the present invention, the slope surface is easily formed around the aperture by allowing the optically transmissive layer to flow. The reflective layer is formed on the optically transmissive layer. The aperture is opened in the reflective layer in a manner such that the aperture overlaps the aperture of the optically transmissive layer. The edge of the aperture of the reflective layer is placed on the slope surface of the optically transmissive layer or within the aperture of the optically transmissive layer. This arrangement allows the color layer to be thickened above the aperture of the reflective layer when the color layer is formed on the reflective layer. When the reflective layer on the slope surface is removed to form the aperture in the manufacturing process of the substrate, no large step takes place in the removed portion. The formation of the aperture is easy, and the aperture is opened with a high degree of accuracy.

In the step of forming the optically transmissive layer, the optically transmissive layer is formed on a portion of the substrate so that the material of the optically transmissive layer flows in the vicinity of the edge thereof forming the slope surface when the optically transmissive layer is softened.

In the present invention, the optically transmissive layer easily forms the slope surface by causing the optically transmissive layer to flow over a portion where no optically transmissive layer is formed when the optically transmissive layer is softened.

Another method of the present invention for manufacturing a substrate assembly for an electrooptical device, includes a step of forming an underlayer on a portion of a substrate, a step of forming, on the underlayer, an optically transmissive layer which substantially transmits light and has a slope surface inclined with respect to the substrate, a step of forming, on the optically transmissive layer, a reflective layer having an aperture, wherein the slope surface is formed close to the edge of the underlayer in the step of forming the optically transmissive layer, and wherein the aperture is formed in the reflective layer in the step of forming the reflective layer so that the edge of the aperture is placed on the slope surface.

In accordance with the present invention, the optically transmissive layer is formed on the partly formed underlayer, and the slope surface is naturally formed along the step caused by the underlayer. The slope surface is thus easily formed.

In the step of forming the reflective layer in the present invention, the reflective layer is preferably formed so that the reflective layer extends over the slope surface from the surface of the optically transmissive layer thereof parallel with the substrate.

In accordance with the present invention, the reflective layer is precisely removed when a portion of the reflective layer formed along a lower section of the slope surface is removed using a chemical such as an etchant.

In the method of the present invention for manufacturing a substrate assembly for an electrooptical device, a finely rugged portion for scattering visible light is preferably formed on the reflective layer. A rugged portion is preferably formed on the surface of the optically transmissive layer.

In accordance with the present invention, the electrooptical device incorporating the substrate assembly prevents a view behind a user and an image of external illumination light from being reflected in the reflective-type display. If a rugged portion is formed beforehand on the surface of the optically transmissive layer, the rugged portion is easily formed on the surface of the reflective layer by simply arranging the reflective layer on the optically transmissive layer. The rugged portion of the reflective layer is controlled by the rugged configuration of the surface of the optically transmissive layer. Even if the material of the reflective layer is difficult to ruggedize, a rugged configuration is easily formed thereon.

In the method for manufacturing a substrate assembly for an electrooptical device, preferably, a rugged portion is formed on the surface of the underlayer in the step of forming the underlayer, a rugged portion is formed on the surface of the optically transmissive layer by forming the optically transmissive layer on the rugged portion of the underlayer in the step of forming the optically transmissive layer, and a finely rugged portion for scattering visible light is formed on the reflective layer by forming the reflective layer on the rugged portion of the optically transmissive layer in the step of forming the reflective layer.

In accordance with the present invention, the rugged portion is formed beforehand on the surface of the under layer. The rugged portion is easily formed on the surface of the optically transflective layer by simply arranging the optically transmissive layer on the underlayer. The rugged portion is also formed on the reflective layer by simply arranging the reflective layer on the optically transmissive layer.

Another method of the present invention for manufacturing a substrate assembly for an electrooptical device, includes a step of forming, on a substrate, a reflective layer having an aperture, a step of forming an optically transmissive layer which substantially transmits light and has, on the reflective layer, a slope surface inclined with respect to the substrate, and a step of forming a color layer on the optically transmissive layer, wherein the slope surface is placed over the edge of the aperture in the step of forming the optically transmissive layer.

Another method of the present invention for manufacturing a substrate assembly for an electrooptical device, includes a step of forming, on a substrate, a reflective layer having an aperture, a step of forming an optically transmissive layer which substantially transmits light and has an aperture which overlaps the aperture of the reflective layer, and a step of forming a color layer on the optically transmissive layer, wherein the slope surface inclined with respect to the substrate is formed around the edge of the aperture in the optically transmissive layer in the step of forming the optically transmissive layer so that the slope surface of the optically transmissive layer or the aperture of the optically transmissive layer on the inside of the slope surface is placed over the edge of the aperture of the reflective layer.

An electrooptical device of the present invention includes a substrate, an optically transmissive layer which, arranged on the substrate, has a slope surface inclined with respect to the substrate, and substantially transmits light, a reflective layer, arranged on the optically transmissive layer, and having an aperture, wherein the edge of the aperture is placed on the slope surface.

Since the edge of the aperture of the reflective layer is placed on the slope surface of the optically transmissive layer, the range of angle of reflection of the reflected light is widened in the electrooptical device. The viewing angle of the reflective-type display is thus widened. In comparison with the case in which a step is formed around the aperture, a patterning operation of the reflective layer is performed easily and precisely.

In the electrooptical device of the present invention, the optically transmissive layer preferably includes a valley portion formed of the slope surface.

In accordance with the present invention, the slope surface forming the valley portion is aligned in multiple directions, and the angle of reflection of external light is widened further. The viewing angle of the reflective-type display in the electrooptical device is increased.

Another electrooptical device of the present invention includes a substrate, an optically transmissive layer which, arranged on the substrate, has an aperture, and substantially transmits light, a reflective layer having an aperture overlapping the aperture of the optically transmissive layer, wherein the optically transmissive layer has a slope surface, inclined with respect to the substrate, around the aperture thereof and wherein the edge of the aperture of the reflective layer is placed on the slope surface or within the aperture of the optically transmissive layer on the inside of the slope surface.

In accordance with the present invention, the edge of the aperture of the reflective layer is placed on the slope surface or within the aperture of the optically transmissive layer on the inside of the slope surface in the electrooptical device. The range of angle of reflection of the reflected light is thus increased. The viewing angle of the reflective-type display is thus widened. In comparison with the case in which a step is formed around the aperture, a patterning operation of the reflective layer is performed easily and precisely.

Preferably, the reflective layer includes a reflective slope surface inclined with respect to the substrate, and the reflective slope surface is arranged at least on the slope surface of the optically transmissive layer. Preferably, the optically transmissive layer includes a surface parallel with the substrate, and the reflective slope surface of the reflective layer extends over the slope surface of the optically transmissive layer from the parallel surface thereof.

In accordance with the present invention, the range of angle of reflection from the reflective slope surface is increased. The viewing angle in the reflective-type display is widened.

Preferably, the reflective layer includes a finely rugged portion for scattering visible light.

In accordance with the present invention, the electrooptical device incorporating the substrate assembly prevents a view behind a user and an image of external illumination light from being reflected in the reflective-type display.

A substrate assembly of the present invention includes a color layer arranged on the optically transmissive layer.

In accordance with the present invention, an area of the color layer that is stacked on the aperture of the reflective layer in plan view becomes a thick portion. The chroma in the transmissive-type display is heightened while the brightness of the reflective-type display is assured (not at the expense of the brightness in the reflective-type display).

Another electrooptical device of the present invention includes a substrate, a reflective layer arranged on the substrate, and having an aperture, and an optically transmissive layer which, arranged on the reflective layer, has a slope surface inclined with respect to the substrate, and substantially transmits light, wherein the slope surface is placed over the edge of the aperture, and wherein the substrate assembly further includes a color layer on the optically transmissive layer.

In accordance with the present invention, at least a portion of the slope surface of the optically transmissive layer overlaps the aperture of the reflective layer. Since the color layer is arranged on the aperture, the color layer is thicker on the aperture than on the remaining portion thereof. The chroma in the transmissive-type display is heightened while the brightness of the reflective-type display is assured (not at the expense of the brightness in the reflective-type display).

Another electrooptical device of the present invention includes a substrate, a reflective layer arranged on the substrate, and having an aperture, and an optically transmissive layer which, arranged on the reflective layer, has an aperture overlapping the aperture of the reflective layer, and substantially transmits light, wherein the optically transmissive layer includes a slope surface, inclined with respect to the substrate, around the aperture thereof, wherein the edge of the aperture of the reflective layer is placed on the slope surface or within the aperture of the optically transmissive layer on the inside of the slope surface, and wherein the substrate assembly includes a color layer on the optically transmissive layer.

In accordance with the present invention, the aperture of the optically transmissive layer overlaps the aperture of the reflective layer, the slope surface is arranged around the aperture in the optically transmissive layer, and the color layer is arranged on the aperture. The color becomes thicker on the aperture than on the remaining portion thereof. The chroma in the transmissive-type display is heightened while the brightness of the reflective-type display is assured (not at the expense of the brightness in the reflective-type display).

A method of the present invention for manufacturing an electrooptical device, includes a step of forming, on a substrate, an optically transmissive layer which substantially transmits light, a step of forming a slope surface, inclined with respect to the substrate, as a portion of the optically transmissive layer by causing the optically transmissive layer to become soft enough to flow, and a step of forming, on the optically transmissive layer, a reflective layer having an aperture, wherein the aperture is opened in the step of forming the reflective layer so that the edge of the aperture is placed on the slope surface.

In accordance with the present invention, the optically transmissive layer is softened, thereby forming the slope surface with the flowability thereof. The reflective layer is formed on the optically transmissive layer, and the aperture of the reflective layer is formed on the slope surface of the optically transmissive layer. When the color layer for the color filter is formed, the thick portion of the color layer is arranged on the aperture of the reflective layer. When the reflective layer on the slope surface is removed to form the aperture in the manufacturing process of the substrate, no large step takes place in the removed portion. The formation of the aperture is easy, and the aperture is opened with a high degree of accuracy.

A method of the present invention for manufacturing an electrooptical device, includes a step of forming, on a substrate, an optically transmissive layer which substantially transmits light and has an aperture, a step of forming a slope surface, inclined with respect to the substrate, around the edge of the aperture by causing the optically transmissive layer to become soft enough to flow, and a step of forming, on the optically transmissive layer, a reflective layer having an aperture overlapping the aperture of the optically transmissive layer, wherein the aperture is formed in the reflective layer in the step of forming the reflective layer so that the edge of the aperture of the reflective layer is placed on the slope surface or within the aperture of the optically transmissive layer on the inside of the slope surface.

In accordance with the present invention, the optically transmissive layer is softened, thereby easily forming the slope surface with the flowability thereof. The reflective layer is formed on the optically transmissive layer, and the aperture of the reflective layer is formed on the aperture of the optically transmissive layer. The slope surface is arranged around the aperture of the optically transmissive layer. When the color layer for the color filter is formed, the thick portion of the color layer is arranged on the aperture of the reflective layer. When the reflective layer on the aperture is removed to form the aperture in the manufacturing process of the substrate, no large step takes place in the removed portion. The formation of the aperture is easy, and the aperture is opened with a high degree of accuracy.

In the step of forming the optically transmissive layer, the optically transmissive layer is formed on a portion of the substrate so that the material of the optically transmissive layer flows in the vicinity of the edge thereof forming the slope surface when the optically transmissive layer is softened.

In accordance with the present invention, the optically transmissive layer easily forms the slope surface by causing the optically transmissive layer to flow over a portion where no optically transmissive layer is formed when the optically transmissive layer is softened.

Another method of the present invention for manufacturing an electrooptical device, includes a step of forming an underlayer on a portion of a substrate, a step of forming, on the underlayer, an optically transmissive layer which substantially transmits light and has a slope surface inclined with respect to the substrate, a step of forming, on the optically transmissive layer, a reflective layer having an aperture, wherein the slope surface is formed close to the edge of the underlayer in the step of forming the optically transmissive layer, and wherein the aperture is formed in the reflective layer in the step of forming the reflective layer so that the edge of the aperture is placed on the slope surface.

In accordance with the present invention, the optically transmissive layer is formed on the partly formed underlayer, and the slope surface is naturally formed along the step caused by the underlayer. The slope surface is thus easily formed.

In the step of forming the reflective layer in the present invention, the reflective layer is preferably formed so that the reflective layer extends over the slope surface from the surface of the optically transmissive layer thereof parallel with the substrate.

In accordance with the present invention, the reflective layer is precisely removed when a portion of the reflective layer formed along a lower section of the slope surface is removed using a chemical such as an etchant.

In the method of the present invention for manufacturing an electrooptical device, a finely rugged portion for scattering visible light is preferably formed on the reflective layer. A rugged portion is preferably formed on the surface of the optically transmissive layer.

In accordance with the present invention, the electrooptical device prevents a view behind a user and external illumination light from being reflected in the reflective-type display. If a rugged portion is formed beforehand on the surface of the optically transmissive layer, the rugged portion is easily formed on the surface of the reflective layer by simply arranging the reflective layer on the optically transmissive layer. The rugged portion of the reflective layer is controlled by the rugged configuration of the surface of the optically transmissive layer. Even if the material of the reflective layer is difficult to ruggedize, a rugged configuration is easily formed thereon.

In the method for manufacturing a substrate assembly for an electrooptical device, preferably, a rugged portion is formed on the surface of the underlayer in the step of forming the underlayer, a rugged portion is formed on the surface of the optically transmissive layer by forming the optically transmissive layer on the rugged portion of the underlayer in the step of forming the optically transmissive layer, and a finely rugged portion for scattering visible light is formed on the reflective layer by forming the reflective layer on the rugged portion of the optically transmissive layer in the step of forming the reflective layer.

In accordance with the present invention, the rugged portion is formed beforehand on the surface of the under layer. The rugged portion is easily formed on the surface of the optically transflective layer by simply arranging the optically transmissive layer on the underlayer. The rugged portion is also formed on the reflective layer by simply arranging the reflective layer on the optically transmissive layer.

Another method of the present invention for manufacturing an electrooptical device, includes a step of forming, on a substrate, a reflective layer having an aperture, a step of forming an optically transmissive layer which substantially transmits light and has, on the reflective layer, a slope surface inclined with respect to the substrate, and a step of forming a color layer on the optically transmissive layer, wherein the slope surface is placed over the edge of the aperture in the step of forming the optically transmissive layer.

Another method of the present invention for manufacturing an electrooptical device, includes a step of forming, on a substrate, a reflective layer having an aperture, a step of forming an optically transmissive layer which substantially transmits light and has an aperture which overlaps the aperture of the reflective layer, and a step of forming a color layer on the optically transmissive layer, wherein the slope surface inclined with respect to the substrate is formed around the edge of the aperture in the optically transmissive layer in the step of forming the optically transmissive layer so that the slope surface of the optically transmissive layer or the aperture of the optically transmissive layer on the inside of the slope surface is placed over the edge of the aperture of the reflective layer.

When optical characteristics are important in each of the above-referenced methods and devices, the thickness of the thick portion of the color layer on the aperture or the slope surface of the optically transmissive layer preferably falls within a range of 2 to 6 times the thickness of the color layer in an area surrounding the aperture (namely, the area of the color layer other than the thick portion thereof), or the thickness of the color layer arranged on the area of the optically transmissive layer other than the slope surface and the aperture of the optically transmissive layer. The thickness of the thick portion of the color layer is now assumed to be less than twice. Assuring sufficient lightness in a reflective region becomes difficult if the color presentation is optimized in a transmissive region. If the lightness in the reflective region is optimized, assuring chroma in the transmissive region becomes difficult. The thickness of the thick portion exceeding 6 times is now assumed. Assuring the chroma in the reflective region becomes difficult if the color presentation is optimized in the transmissive region. If the color presentation is optimized in the reflective region, assuring the lightness in the transmissive region becomes difficult without increasing the light quantity of a backlight, and the flatness of a color filter substrate becomes difficult to assure.

To satisfy the flatness and the optical characteristics of the color filter at the same time, the mean thickness of the thick portion of the color filter overlapping the aperture of the reflective layer preferably falls within a range from 1.0 to 3.0 µm, and the thickness of the color layer in the area thereof overlapping the reflective layer surrounding the aperture (the thickness of the color layer other than the aperture) preferably falls within a range of 0.2 to 1.5 µm. In this arrangement, the non-uniformity in the thickness of the color filter due to the presence of the thick portion thereof is reduced and the quality of the color presentation in the reflective region and the transmissive region is improved.

Electronic apparatus of the present invention includes one of the above-referenced electrooptical devices and control means for controlling the electrooptical device. As the electronic apparatus of the present invention, mobile electronic apparatus such as a mobile telephone or a mobile information terminal is preferable because the transflective-type electrooptical device is effectively used therewithin.

BRIEF DESCRIPTION OF THE DRAWINGS

FIG. 3(a) is a partially enlarged cross-sectional view of the internal structure of a pixel in the color filter substrate of the first embodiment, and FIG. 3(b) is a partially enlarged plan view of the pixel.

FIG. 7(a) is a partially enlarged cross-sectional view of the internal structure of a pixel in a color filter substrate of the liquid-crystal device in accordance with a fifth embodiment of the present invention, and FIG. 7(b) is a partially enlarged plan view of the pixel.

DETAILED DESCRIPTION OF THE PREFERRED EMBODIMENTS

With reference to the accompanying drawings, the embodiments of a substrate assembly for an electrooptical device, a method for manufacturing the substrate assembly, the electrooptical device, a method for manufacturing the electrooptical device, and electronic apparatus will now be discussed in detail.

[First Embodiment]

The electrooptical device of a first embodiment of the present invention will be discussed with reference to FIG. 1 and FIG. 2.

Figure 1:
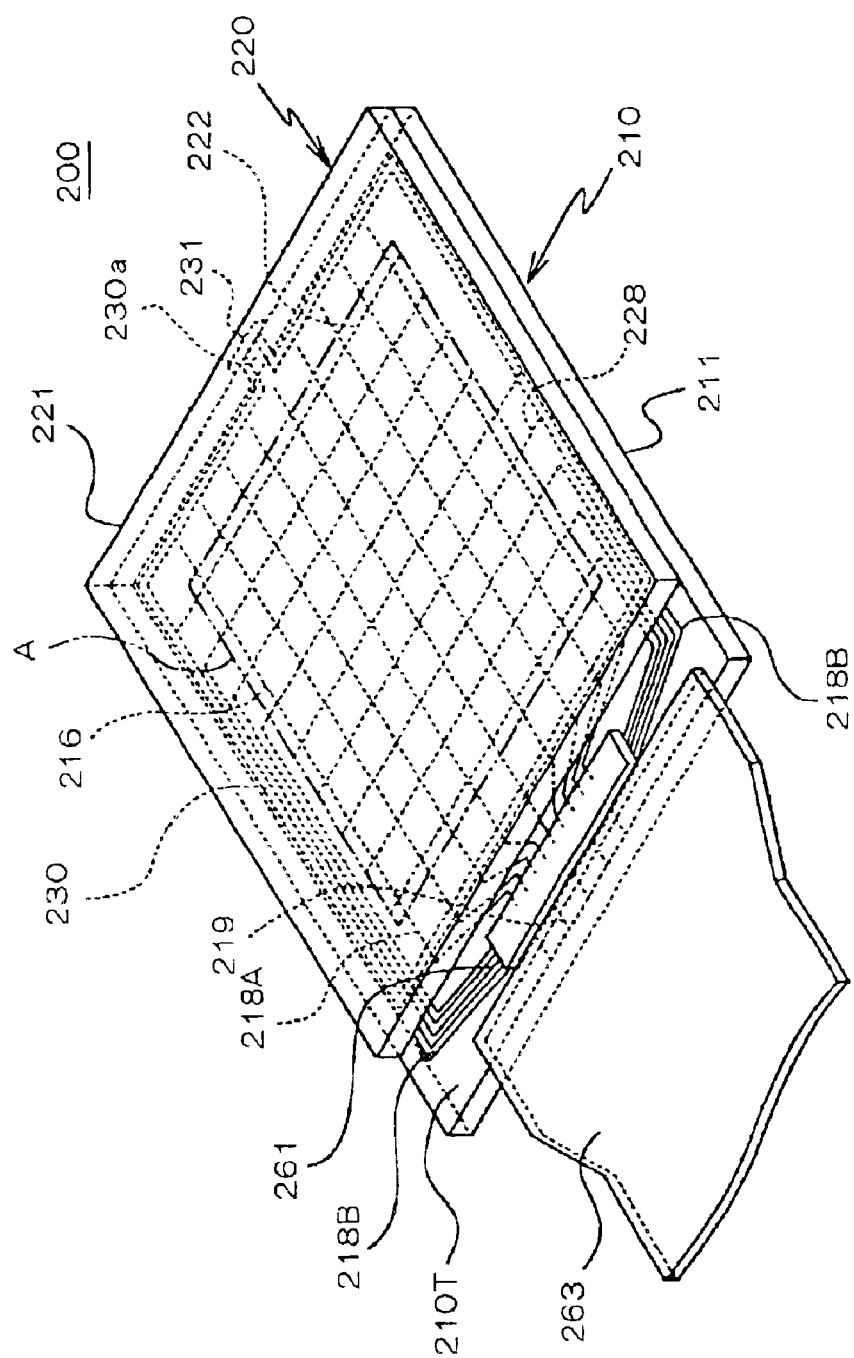
FIG. 1 is a perspective view diagrammatically illustrating the external appearance of a liquid-crystal panel in accordance with a first embodiment of the present invention.
Figure 2:
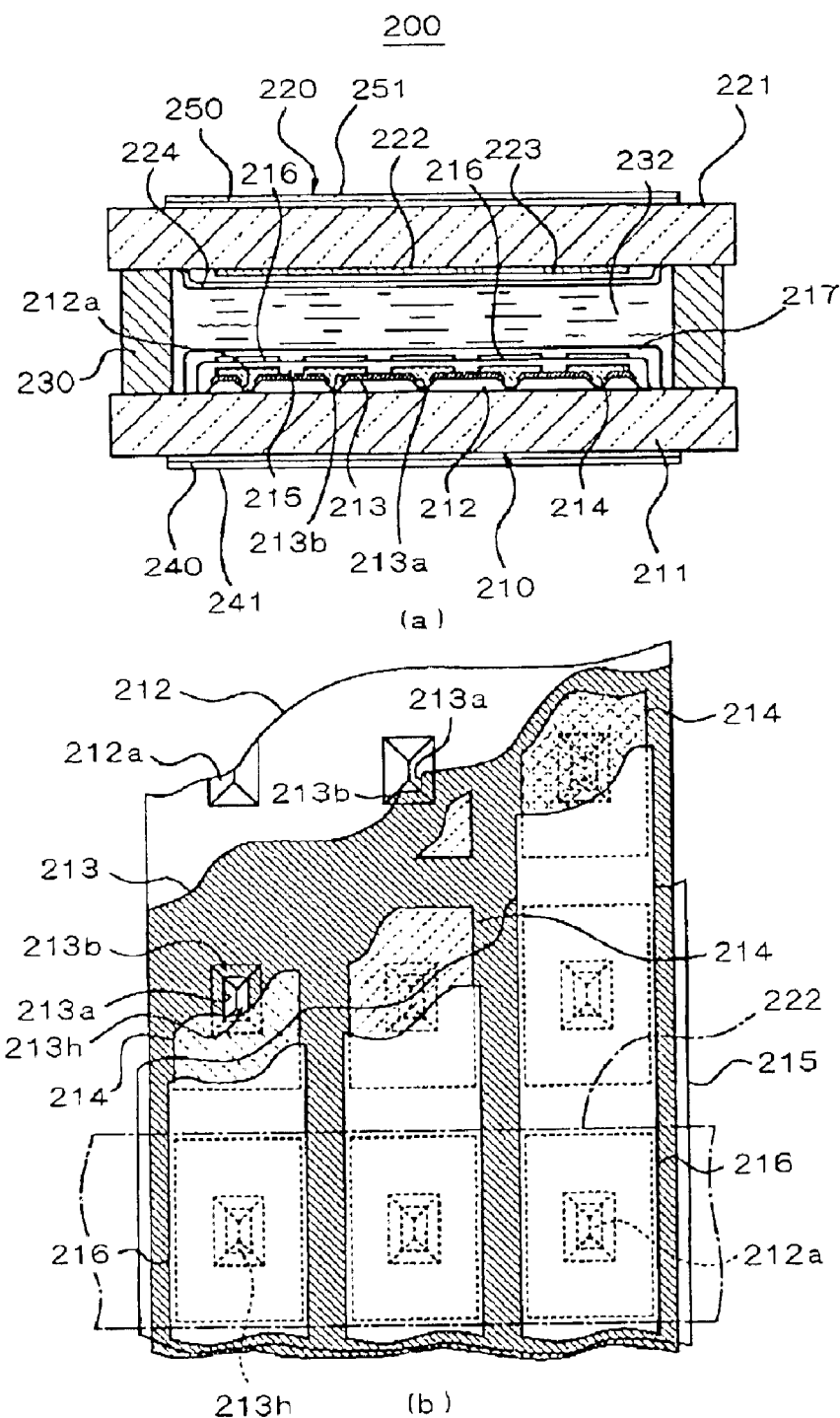
FIG. 2(a) is a cross-sectional view diagrammatically illustrating the panel structure of the first embodiment.
FIG. 2(b) is a partially enlarged plan view illustrating the planar structure of a color filter substrate.

FIG. 1 is a diagrammatic external perspective view illustrating a liquid-crystal panel 200 forming a liquid-crystal device in accordance with the first embodiment of the present invention. FIG. 2(a) is a diagrammatic perspective view of the liquid-crystal panel 200, and FIG. 2(b) is an enlarged plan view illustrating a portion of a color filter substrate 210 forming the liquid-crystal panel 200.

The liquid-crystal device includes a reflective-type passive-matrix liquid-crystal panel 200, an unshown illumination device such as an unshown backlight or a front light and a case attached to the liquid-crystal panel 200.

Referring to FIG. 1, the liquid-crystal panel 200 includes a color filter substrate 210 including, as a base body, a first transparent substrate 211 fabricated of a glass plate or a synthetic resin plate, and a counter substrate 220 including, as a base body, a second substrate 221 that is similar to and opposed to the first substrate 211, with both substrates bonded together with a sealing member 230 interposed therebetween. A liquid crystal 232 is introduced into the enclosure defined by the sealing member 230 through an inlet port 230a, and then the inlet port 230a is closed with a sealant 231. The cell structure of the liquid-crystal panel 200 is thus constructed.

A plurality of striped transparent electrodes 216 is formed on the inner surface of the first substrate 211 (the surface of the first substrate 211 facing the second substrate 221), and a plurality of striped transparent electrodes 222 is formed on the inner surface of the second substrate 221. The transparent electrodes 216 are electrically connected to wirings 281A, and the transparent electrodes 222 are electrically connected to wirings 228. The transparent electrodes 216 mutually intersect the transparent electrodes 222, and a matrix of pixels is formed with each pixel at a respective intersection. A matrix of the pixels forms a display area A.

The first substrate 211 has an extension portion 210T extending beyond the outline of the second substrate 221. Arranged on the extension portion 210T are the wirings 218A, wirings 218B electrically connected to wirings 288 through vertical conductors formed of a portion of the sealing member 230, and input terminals 219 formed of a plurality of separately formed wiring patterns. A semiconductor IC 261 containing a liquid-crystal driving circuit electrically connected to the wirings 218A, 218B, and the input terminals 219 is mounted on the extension portion 210T. A flexible wiring board 263 is mounted on the end of the extension portion 210T to be electrically connected to the input terminals 219.

Referring to FIG. 2(a), a retardation film (¼-wave film) 240 and a polarizer 241 are arranged on the outer surface of the first substrate 211 and a retardation film (¼-wave film) 250 and a polarizer 251 are arranged on the outer surface of the second substrate 221 in the liquid-crystal panel 200.

Referring to FIGS. 2(a) and 2(b), the construction of the color filter substrate 210, namely, the substrate assembly for the electrooptical device of the present invention will be discussed in detail. An optically transmissive layer 212 exhibiting optical transmittance to visible light is arranged on the surface of the first substrate 211. The optically transmissive layer may be formed of an organic resin layer fabricated of acrylic resin or epoxy resin. The optically transmissive layer is preferably substantially transparent to visible light. For example, the optically transmissive layer has an optical transmittance of approximately 70% or more to visible light with variations in optical transmittance to within a range of 10% in the visible light region.

The optically transmissive layer 212 has partly a slope surface 212a inclined with respect to the surface of the first substrate 211 for each pixel. As shown, the slope surface 212a is generally configured in a (V-shaped) valley in cross section.

A reflective layer 213 is deposited on the optically transmissive layer 212. The reflective layer 213 is formed of a metal layer fabricated of aluminum, an aluminum-based alloy, chromium, a chromium-based alloy, silver, or a silver-based alloy. The reflective layer 213 has an aperture 213h at each pixel. The aperture 213h is formed so that the edge 213a of the aperture is positioned on the slope surface 212a of the optically transmissive layer 212.

The reflective layer 213 has a flat portion which is flat on the flat surface of the optically transmissive layer 212, but is arranged on the slope surface 212a in the vicinity of the aperture 213h, thereby becoming a reflective slope surface 213b inclined at an angle approximately equal to the inclination angle of the slope surface 212a. The reflective slope surface 213b extends over the slope surface 212a from the flat portion of the reflective layer 213.

A color layer 214 is deposited on the optically transmissive layer 212 for each pixel. A surface protective layer (overcoat layer) 215, fabricated of a transparent resin, covers the color layers 214. A color filter is formed of the color layers 214 and the surface protective layer 215.

The color layer 214 exhibits a predetermined color tone with a color material such as a pigment or a dye dispersed in a transparent resin. Available as an example of color tone for the color layer is the combination of R (red), G (green), and B (blue) for the primary-color filter, for example. The present invention is not limited to this. Alternatively, the complementary color system or other color system may be used. A color resist formed of a photosensitive resin containing a color material such as a pigment or a dye is typically applied on the substrate, and unwanted portions of the color resist is removed through the photolithographic process. A color layer having a predetermined color pattern is thus produced. To produce a plurality of color layers of a plurality of color tones, this process is repeated.

In this embodiment, the color layer 214 is formed in the region including the slope surface 212a of the optically transmissive layer 212. The color layer 214 formed on the slope surface 212a is thicker than the remaining portion thereof. Specifically, the optically transmissive layer 212 has the slope surface 212a in a (V-shaped) valley in cross section, and a thick portion 214a of the color layer 214 formed on the slope surface 212a (see FIG. 3) has a V shape in cross section toward the first substrate 211.

The layout pattern of the color layers is a stripe configuration as shown in FIG. 2(b). Besides the stripe configuration, a variety of layout patterns such as a delta configuration or a mosaic configuration may be employed.

The transparent electrodes 216, formed of electrically conductive transparent material such as ITO (Indium-Tin Oxide), are arranged on the surface protective layer 215. The transparent electrodes 216 have band-like shapes vertically extending in FIG. 2(b) side by side in a stripe configuration. An alignment layer 217, fabricated of polyimide, are formed on the transparent electrodes 216.

The counter substrate 220 facing the color filter substrate 210 includes the second substrate 221 fabricated of glass or the like. Arranged successively on the second substrate 221 are transparent electrodes 222 like the transparent electrodes 216, a hard protective layer 223 fabricated of $SiO_2$ or $TiO_2$, and an alignment layer 224 like the alignment layer 217 in that order.

In the embodiment thus constructed, external light incident on the counter substrate 220 is transmitted through the liquid crystal 232, and the color filter, and is then reflected from the reflective layer 213, is transmitted through the liquid crystal 232 and the counter substrate 220 again, and then exits outwardly. The reflected light has been transmitted through the color layer 214 twice.

The color layer 214 covers the aperture 213h of the reflective layer 213. If a backlight is arranged behind the color filter substrate 210 to illuminate the color filter substrate 210 from behind, a portion of the illumination light is passed through the slope surface 212a of the optically transmissive layer 212 and the aperture 213h of the reflective layer 213, and is transmitted through the color layer 214, the liquid crystal 232, and then the counter substrate 220, and then exits outwardly. The transmitted light has been transmitted through the color layer 214 once.

In this embodiment, the optically transmissive layer 212 is formed on the first substrate 211, the slope surface 212a is formed on the optically transmissive layer 212, and the reflective layer 213, having the edge 213a of the aperture arranged on the slope surface 212a, is formed on the optically transmissive layer 212. In the embodiments of the manufacturing method, as will be discussed in detail later, the patterning of the reflective layer 213 becomes easy, and the reflective layer 213 is formed with a high precision.

FIG. 3(a) is an enlarged cross-sectional view of a single pixel in the color filter substrate 210 of the liquid-crystal panel 200, and FIG. 3(b) is an enlarged plan view of the same pixel. Since the reflective slope surface 213b of the reflective layer 213 is arranged on a portion of the slope surface 212a of the optically transmissive layer 212 as shown, the range of angle of reflection of the external light is increased. The viewing angle characteristics of the liquid-crystal panel 200 become mild. The viewing angle of the reflective-type display is widened even when the user views the liquid-crystal panel 200 at an inclination angle with respect to the surface thereof.

The color layer 214 of this embodiment has the thick portion 214a on the slope surface 212a of the optically transmissive layer 212. The thick portion 214a overlaps the aperture 213h of the reflective layer 213 in plan view. Transmissive light OT is transmitted through the first substrate 211, the slope surface 212a, and then the thick portion 214a of the color layer 214, and then exits out of the counter substrate 220. Reflective light OR, which is reflected from the reflective layer 213, is transmitted through the portion of the color layer 214 other than the thick portion 214a (a thin portion) twice, and then exits.

Figure 13:
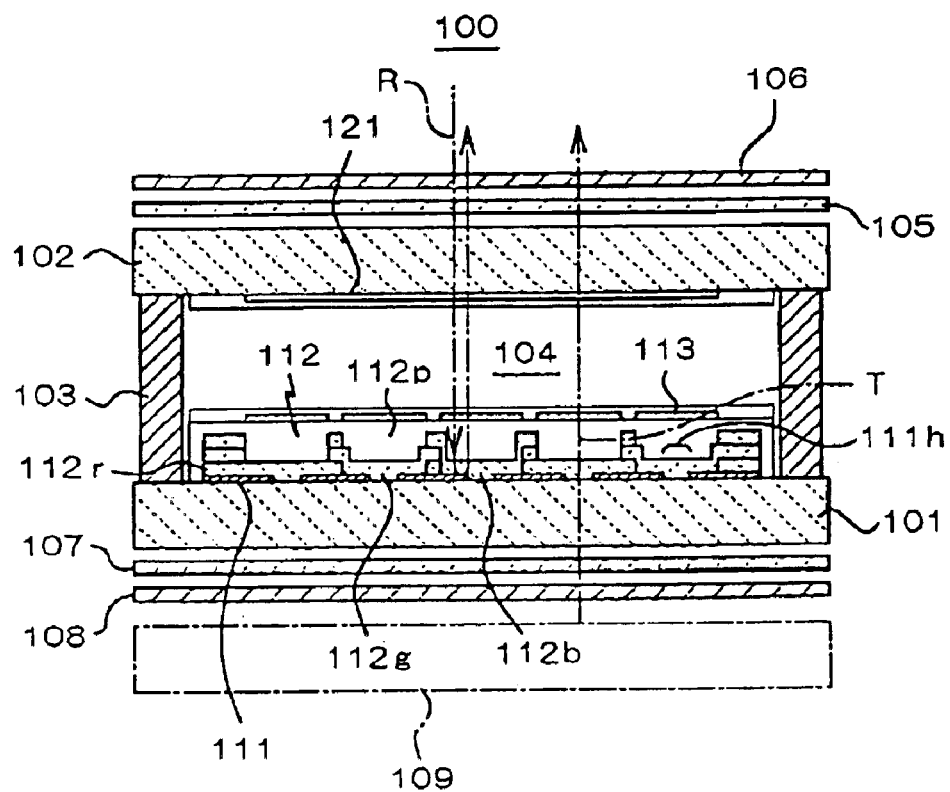
FIG. 13 is a cross-sectional view diagrammatically illustrating the structure of a conventional transflective-type liquid-crystal panel.

In this way, the reflective light OR is transmitted through the thin portion of the color layer 214 twice while the transmissive light OT is transmitted through the color layer 214 on the thick portion 214a thereof only once. In comparison with the transflective-type liquid-crystal display panel 100 having the conventional structure as shown in FIG. 13, the chroma in the transmissive-type display is increased with the brightness of the reflective-display maintained, namely, not at the expense of the brightness of the reflective-type display. In other words, a difference in chroma between the reflective-type display and the transmissive-type display is reduced.

When the optical characteristics of the color filter are important in this embodiment, in other words, when excellent color reproduction characteristics in both the transmissive-type display and the reflective-type display are important, the mean thickness of the thick portion 214a overlapping the aperture 213h of the reflective layer 213 preferably falls within a range of 2 through 6 times the thickness of the color layer on the flat portion of the reflective layer. The mean thickness of the thick portion 214a of the color layer is now assumed to be less than twice. Then, assuring sufficient lightness in a reflective region becomes difficult if the color presentation is optimized in a transmissive region. If the lightness in the reflective region is optimized, assuring chroma in the transmissive region becomes difficult. The mean thickness of the thick portion 214a exceeding 6 times is now assumed. Then, assuring the chroma in the reflective region becomes difficult if the color presentation is optimized in the transmissive region. If the color presentation is optimized in the reflective region, assuring the lightness in the transmissive region becomes difficult without increasing the light quantity of a backlight, and the flatness of a color filter substrate becomes difficult to assure.

When an actual liquid-crystal display device is constructed, the flatness of the color filter is important to improve image quality while the uniformity in thickness of the liquid-crystal layer and color reproduction characteristics are maintained. The optical characteristics of the color filter are important to improve quality in the color presentation in the transmissive-type display and the reflective-type display. The inventors of this invention have found that the limiting of the thickness of the color layer 214 to within a predetermined range is important to satisfy both the flatness and optical characteristics of the color filter.

Specifically, the flatness and the optical characteristics of the color filter are both satisfied by limiting the mean thickness Dt of the thick portion 214a of the color layer 214 (the thickness of the color layer in the transmissive region) to within a range of from 1.0 to 3.0 $\mu$m, and by limiting the thickness Ds of the remaining portion of the color layer (the thickness of the color layer in the reflective region) to within a range of from 0.2 to 1.5 $\mu$m. If the thickness Dt is increased above the upper limit of the range, the step of the color layer becomes large, making it difficult to assure the flatness. If the thickness Dt is decreased below the lower limit of the range, it becomes difficult to assure the chroma of the transmissive-type display. If the thickness Ds is increased above the upper limit of the range, the step of the color layer becomes large, making it difficult to assure the flatness. If the thickness Ds is decreased below the lower limit of the range, it becomes difficult to assure the chroma of the transmissive-type display. Even within the thickness of the color layer satisfying the ranges of Dt and Ds, the ratio of Dt and Ds preferably falls within a range of 2 to 6 times.

In this embodiment, the thicknesses Dt and Ds of the color layer 214 are set by forming the optically transmissive layer 212 on the reflective layer 213. When the color layer 214 is formed, a dimple occurs on the top surface of the thick portion 214a, leading to another dimple on the surface of the surface protective layer 215. By setting the thicknesses Dt and Ds to within the respective predetermined ranges, the depth of each dimple is reduced, and the uniformity in the thickness and color reproduction characteristics of the liquid-crystal layer are improved. Specifically, the depth of the dimple of the color layer 214 is preferably within 0.5 $\mu$m or less, and the depth of the dimple of the surface protective layer 215 is preferably 0.2 $\mu$m or less. If the depth of the dimple of the surface protective layer 215 is set to be 0.1 $\mu$m or less, an good-quality liquid-crystal display device free from display non-uniformity results.

The flatness of the surface of the color layer 214 is assured by causing the material of the color layer 214 to easily flow and by improving filling characteristics thereof. To this end, the inclination angle of the slope surface 212a of the optically transmissive layer 212 (also the inclination angle of the reflective slope surface 213b of the reflective layer 213 in this embodiment) preferably falls within a range of 68 to 79 degrees with respect to the first substrate 211 (11 to 22 degrees with respect to a direction normal to the first substrate 211). If the slope surface 212a becomes steeper than this range, the effect of improving the flowability and the filling characteristics of the material is degraded. Making the slope surface 212a to be milder than this range is difficult in the actual manufacturing process.

[Second Embodiment]

Figure 4:
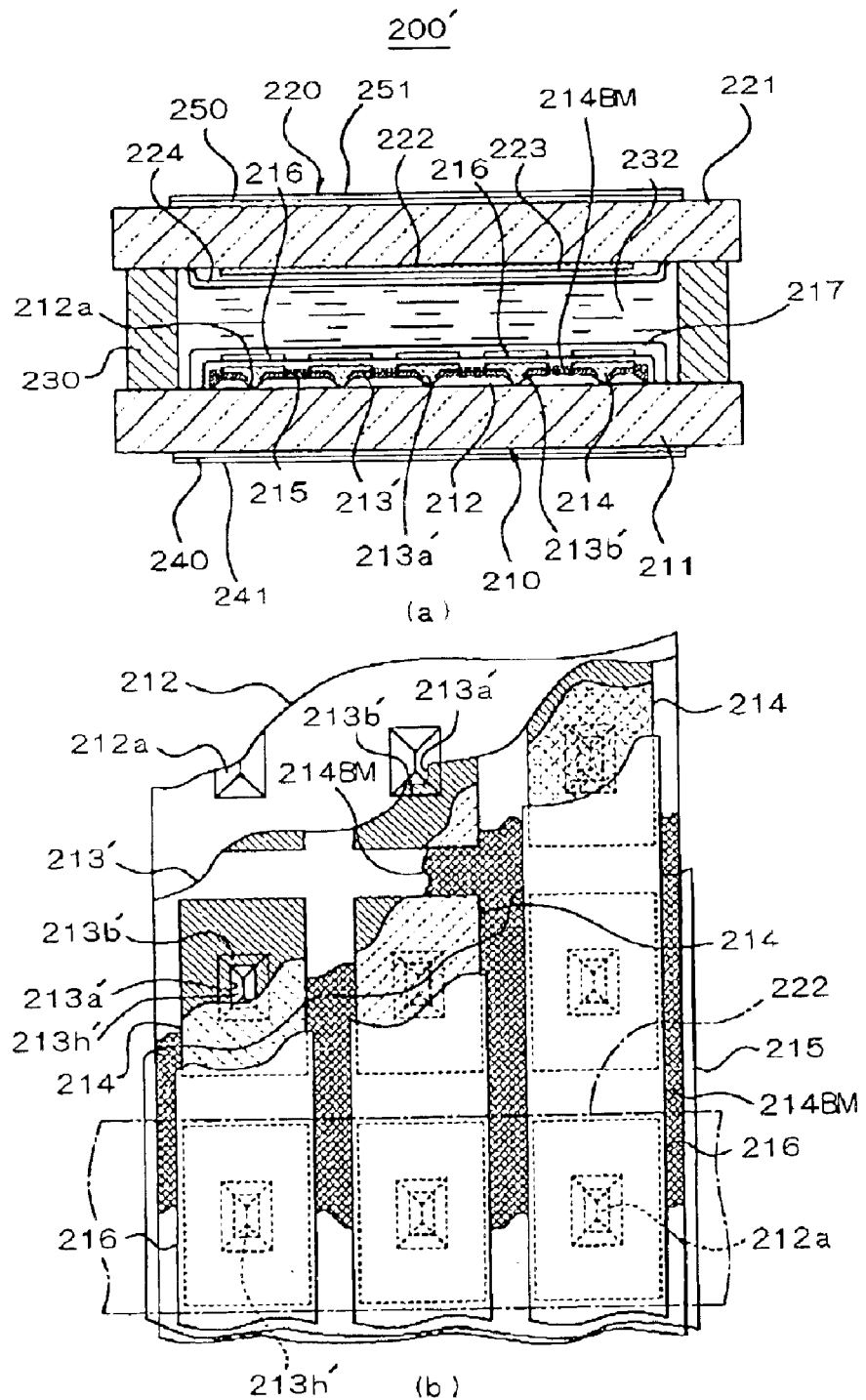
FIG. 4(a) is a cross-sectional view diagrammatically illustrating a panel structure in accordance with a second embodiment of the present invention.
FIG. 4(b) is a partially enlarged plan view illustrating a planar structure of a color filter substrate.

Referring to FIGS. 4(a) and 4(b), the construction of the liquid-crystal panel 200' of a second embodiment of the present invention is discussed below. The liquid-crystal panel 200' has a construction substantially identical to that of the liquid-crystal panel 200. As in the first embodiment, the liquid-crystal panel 200' includes, on the color filter substrate 210, the first substrate 211, the optically transmissive layer 212, the color layer 214, the surface protective layer 215, the transparent electrodes 216, the alignment layer 217, and the second substrate 221 and the hard protective layer 223, and the alignment layer 224 on the counter substrate 220. Furthermore, as in the first embodiment, the liquid-crystal panel 200' includes the sealing member 230, the liquid crystal 232, the retardation films 240 and 250, and the polarizers 241 and 251. The description thereof is omitted here.

In this embodiment, one reflective layer 213' formed on the optically transmissive layer 212 is separated from the other on a pixel by pixel basis. Like in the first embodiment, the reflective layer 213' has the aperture 213h' for each pixel. A black light-blocking film (black matrix or black mask) 214BM is arranged in inter-pixel areas between color layers 214, each formed for a respective pixel. The black light-blocking film 214BM may be a resin or other base material into which a black pigment or a black dye is dispersed, or a resin or other base material into which the three R (red), G (green), and B (blue) color materials are dispersed.

In the first and second embodiments, the color layer is arranged on the laminate of the optically transmissive layer and the reflective layer. When a liquid-crystal panel needs no color filter (for example, a liquid-crystal panel presenting a monochrome display) or when a color filter is arranged on the counter substrate 220 (on the second substrate 221), transparent electrodes may be arranged on an insulator directly on the reflective layer.

In this embodiment, the mean thickness of the thick portion overlapping the aperture 213h' of the reflective layer 213' preferably falls within 2 to 6 times the thickness of the color layer on the flat portion of the reflective layer. The mean thickness Dt of the thick portion of the color layer 214 (the thickness of the color layer in the transmissive region) is preferably limited to within a range of from 1.0 to 3.0 µm, and the thickness Ds of the remaining portion of the color layer (the thickness of the color layer in the reflective region) is preferably limited to within a range of from 0.2 to 1.5 µm.

[Third Embodiment]

Referring to FIGS. 5(a)–5(e), the manufacturing process of the color filter substrate 210 is discussed below, which is applicable to the method for manufacturing the liquid-crystal device of the present invention, or the method for manufacturing the substrate assembly for the liquid-crystal device of the present invention.

Figure 5:
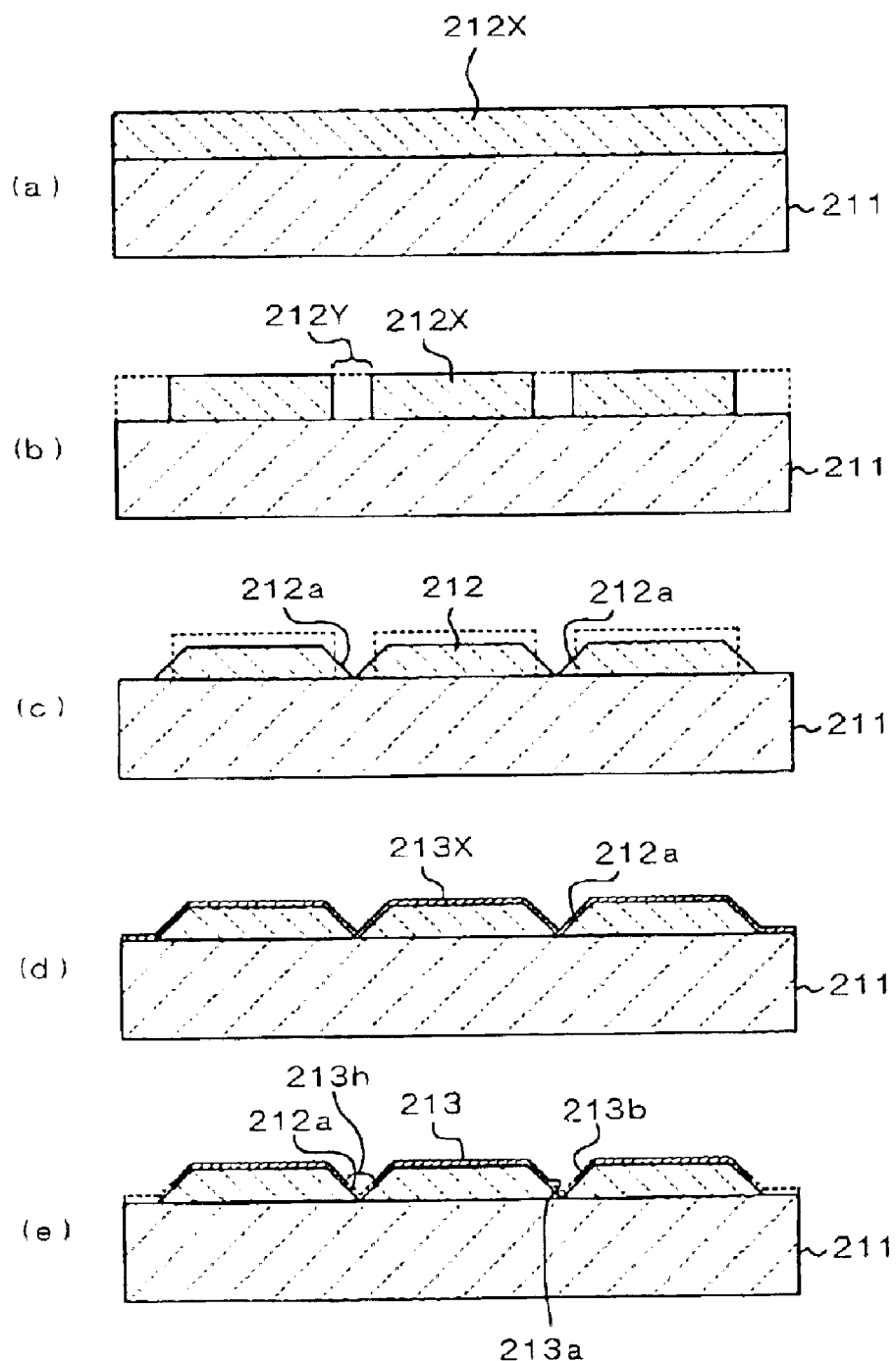
FIGS. 5(a)–5(e) illustrate the method for manufacturing the liquid-crystal device in accordance with a third embodiment of the present invention.

Referring to FIG. 5(a), an optically transmissive layer 212X is formed entirely on the surface of the first substrate 211. The optically transmissive layer 212X, fabricated of a transparent resin such as acrylic resin or epoxy resin, is applied and then dried.

Referring to FIG. 5(b), an aperture 212Y is formed in the optically transmissive layer 212X on the first substrate 211 for each pixel using the photolithographic technique and etching process. The optically transmissive layer 212X is then softened to be flowable through a heat treatment, and the slope surface 212a is formed in the vicinity of the edge of the aperture 212Y with reference to FIG. 5(c).

The optically transmissive layer 212 is then entirely covered with a metal such as aluminum, an aluminum-based alloy, chromium, a chromium-based alloy, silver, a silver-based alloy, through a deposition process or a sputtering process. A reflective layer 213X is thus formed as shown in FIG. 5(d). The reflective layer 213X is then subjected to the photolithographic process and the etching process to form the aperture 213h as shown in FIG. 5(e). The edge 213a of the aperture is formed on the slope surface 212a of the optically transmissive layer 212. The reflective layer 213 is thus completed. The reflective layer 213 thus extends over a portion (an outer edge) of the slope surface 212a from the flat portion of the optically transmissive layer 212.

In each of the above embodiments, and this embodiment, the slope surface 212a of the optically transmissive layer 212 has a V-shape in cross section. This is drawn for exemplary purposes, and in practice, the valley may have a curved slope surface.

The color layer 214 shown in FIG. 3 may be formed for each pixel to produce the color filter substrate for the substrate assembly for the liquid-crystal device in accordance with the first embodiment. The color layer 214 may be produced by patterning a transparent resin into which a color material such as a pigment or a dye having a predetermined color tone is dispersed. For example, a photosensitive resin having a predetermined color tone is applied on the substrate, and is exposed to a predetermined exposure pattern, and is then subjected to a development process. The color layer thus results. To form the color layers of a plurality of colors (R, G, and B, for example) in a predetermined layout pattern, the above process is repeated for each color.

When the aperture 213h is opened in the reflective layer 213 in this embodiment, a portion to be removed for the aperture 213h is above the slope surface 212a of the optically transmissive layer 212. There is no large step in that portion, and the reflective slope surface 213b is mildly sloped. In this way, a forming process for a mask of a resist for the aperture 213h and a patterning process such as etching are easily and accurately performed.

[Fourth Embodiment]

Referring to FIGS. 6(a)–6(e), another manufacturing process of the color filter substrate 210 is discussed below, which is applicable to the method for manufacturing the liquid-crystal device of the present invention.

Figure 6:
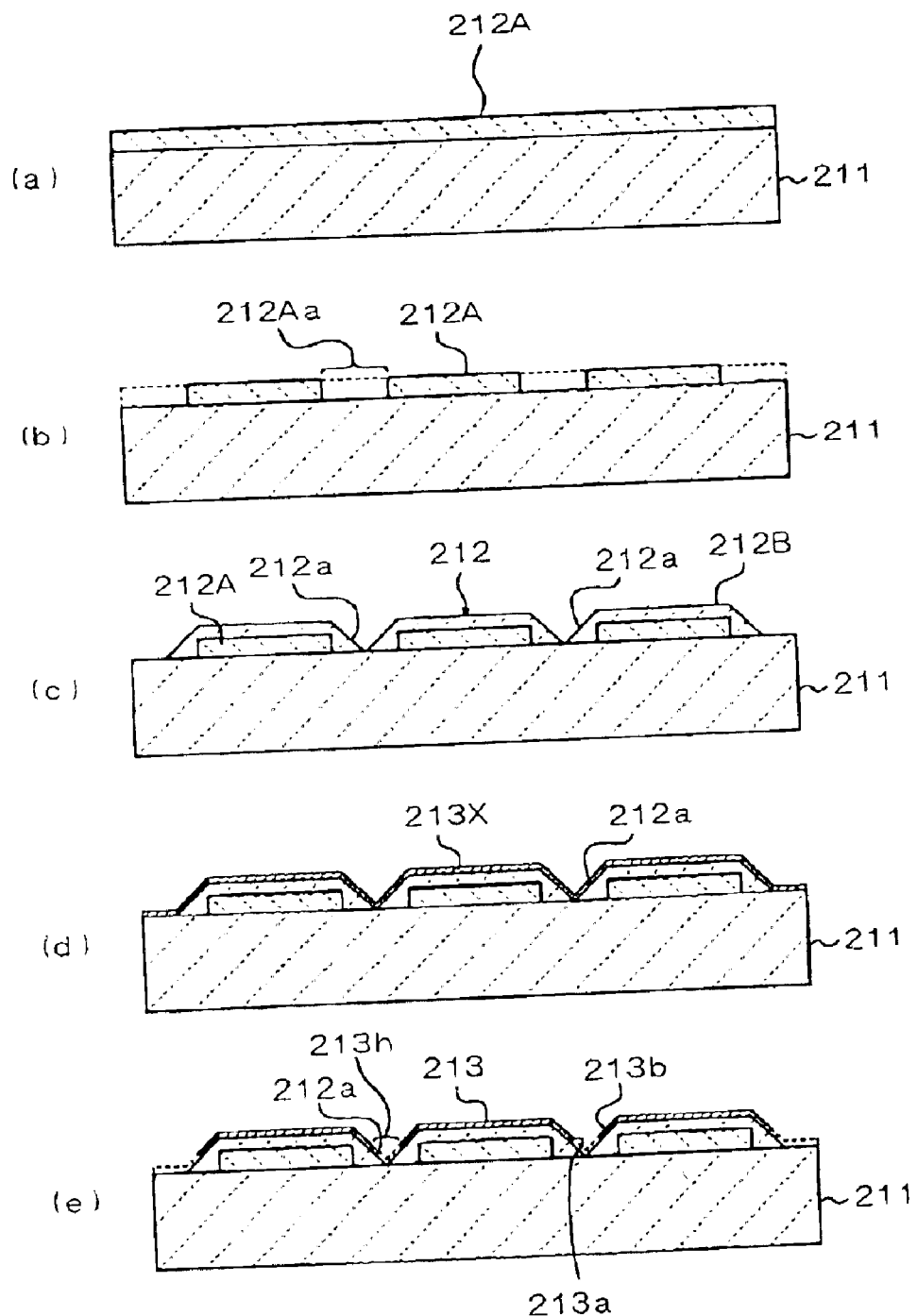
FIGS. 6(a)–6(e) illustrate the method for manufacturing the liquid-crystal device in accordance with a fourth embodiment of the present invention.

In this embodiment, an underlayer 212A is formed on the first substrate 211 as shown in FIG. 6(a). An aperture 212Aa is formed in the underlayer 212A for each pixel as illustrated in FIG. 6(b). The underlayer 212A has preferably optical transmittance, but an underlayer 212A having no optical transmittance is also acceptable. Since it is not necessary to soften and flow the underlayer 212A, the underlayer 212A may be formed of a hard film such as of $SiO_2$ or $TiO_2$.

Referring to FIG. 6(c), an optically transmissive layer 212B is formed on the underlayer 212A. Although the material and the formation method of the optically transmissive layer 212B remain unchanged from those already discussed in connection with the third embodiment, the optically transmissive layer 212B may be formed of a hard film such as of $SiO_2$ or $TiO_2$, because it is not necessary to soften and flow the optically transmissive layer 212B.

The optically transmissive layer 212B is formed on the substantially entire surface of the substrate. Since the aperture 212Aa is formed in the underlayer 212A for each pixel, a slope surface 212a is formed on the surface of the optically transmissive layer 212B in the vicinity of the edge of the aperture of the underlayer 212A.

As in the third embodiment, the reflective layer 213X is then formed as illustrated in FIG. 6(d), and the aperture 213h is opened as illustrated in FIG. 6(e). The reflective layer 213 is thus completed.

The color layer 214 shown in FIG. 3 may be formed for each pixel to produce the color filter substrate for the substrate assembly for the liquid-crystal device in accordance with the first embodiment. The formation process for the color layer remains unchanged from that in the third embodiment.

[Fifth Embodiment]

Referring to FIG. 7, the liquid-crystal panel and the substrate assembly for the liquid-crystal device in accordance with a fifth embodiment of the present invention are discussed below. The liquid-crystal panel in this embodiment has a construction substantially identical to that of the liquid-crystal panel 200 in the first embodiment, and like components are nor shown neither discussed, and difference only therebetween is discussed below.

In this embodiment, an optically transmissive layer 312 is formed on the first substrate 211, and a finely rugged portion is formed on the surface of the optically transmissive layer 312. A slope surface 312a of the optically transmissive layer 312 is constructed in the same way as in the first embodiment.

A reflective layer 313 is formed on the optically transmissive layer 312. As in the first embodiment, the reflective layer 313 has an edge 313a of the aperture on the slope surface 312a of the optically transmissive layer 312. Since the reflective layer 313 is arranged on the finely rugged portion of the optically transmissive layer 312, the reflective layer 313 has also a reflective surface generally conformal to the rugged portion of the optically transmissive layer 312. The finely rugged reflective surface scatters visible light.

Since the reflective layer 313 has the finely rugged (irregular) portion on the flat reflective area thereof in this embodiment, reflection of an image or illumination light due to the specular reflection of the reflective layer is thus prevented.

[Sixth Embodiment]

Referring to FIGS. 8(a)–8(e), a manufacturing process of the color filter substrate (substrate assembly for the liquid-crystal device) of the fifth embodiment in accordance with a sixth embodiment of the present invention is discussed, which is applicable to the method for manufacturing the liquid-crystal device and the substrate assembly for the liquid-crystal device.

Figure 8:
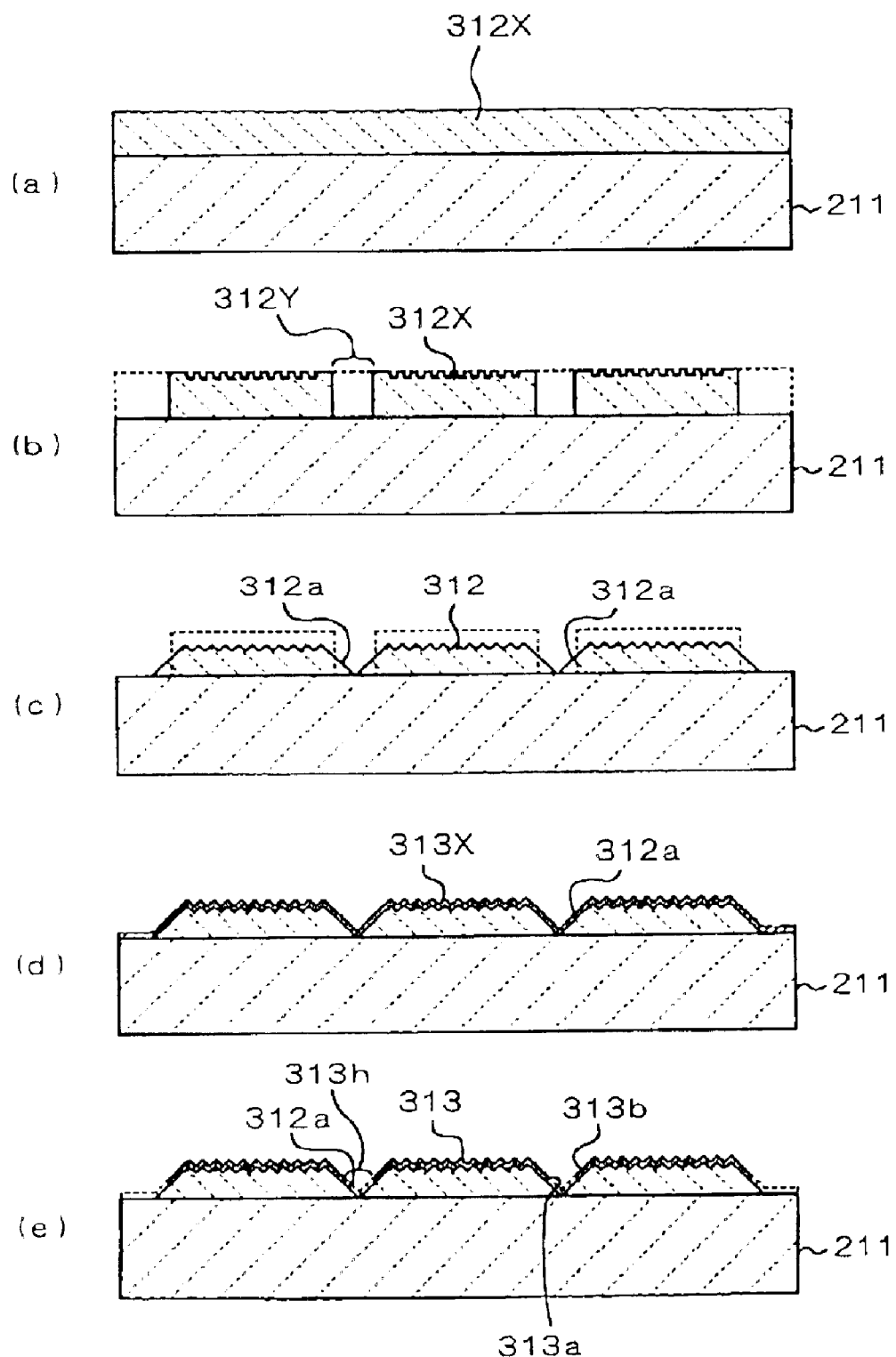
FIGS. 8(a)–8(e) illustrate the method for manufacturing the liquid-crystal device in accordance with a sixth embodiment of the present invention.

In this embodiment, an optically transmissive layer 312X is formed on the first substrate 211 using the same material and the same method as those in the third embodiment with reference to FIG. 8(a). Referring to FIG. 8(b), an aperture 312Y is opened in the optically transmissive layer 312X using the photolithographic process and the etching process as in the third embodiment. A fine rugged portion is then formed on the surface of the optically transmissive layer 312X using the photolithographic process and the etching process.

Referring to FIG. 8(c), the optically transmissive layer 312X is softened through the heating process as in the third embodiment to flow itself in the edge of the aperture. The optically transmissive layer 312 has thus the slope surface 312a. The finely rugged portion on the surface of the optically transmissive layer 312X is slightly deformed when the material thereof is softened, but the rugged portion itself still remains on the surface of the optically transmissive layer 312X.

Referring to FIG. 8(d), the reflective layer 313X is produced using the same material and the same method as those discussed in connection with the third embodiment. The reflective layer 313X has also a finely rugged reflective surface generally conformal to the finely rugged portion of the optically transmissive layer 312.

The reflective layer 313X is then patterned using the photolithographic process and the etching process to form an aperture 313h. The reflective layer 313 is thus obtained.

To form the color filter substrate as the substrate assembly for the liquid-crystal device in accordance with the fifth embodiment, the color layer 214 illustrated in FIG. 27 is formed for each pixel as already discussed in connection with the third embodiment.

[Seventh Embodiment]

Figure 9:
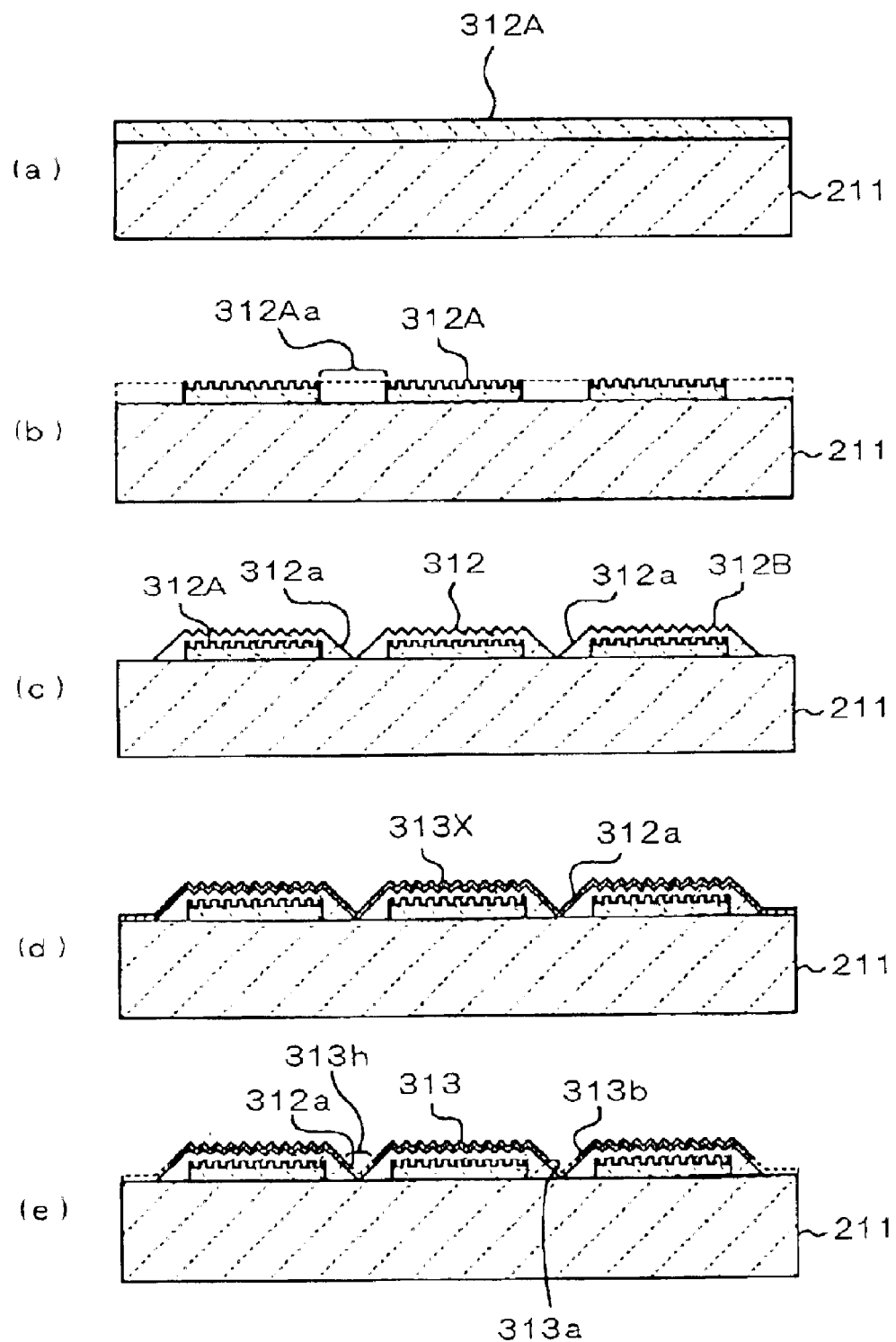
FIGS. 9(a)–9(e) illustrate the method for manufacturing the liquid-crystal device in accordance with a seventh embodiment of the present invention.

Referring to FIG. 9, a manufacturing process of the color filter substrate (substrate assembly for the liquid-crystal device) of the fifth embodiment in accordance with a seventh embodiment of the present invention is discussed, which is applicable to the method for manufacturing the liquid-crystal device and the substrate assembly for the liquid-crystal device.

In this embodiment, the underlayer 312A identical to that in the fourth embodiment is formed on the first substrate 211 as shown in FIG. 9(a). Referring to FIG. 9(b), a finely rugged portion is formed on the surface of the underlayer 312A using the photolithographic process and the etching process.

Referring to FIG. 9(c), an optically transmissive layer 312B is formed on the underlayer 312A. The material and the formation method of the optically transmissive layer 312B remain unchanged from those in the fourth embodiment. The top surface of the first substrate 211 and the underlayer 312A are almost entirely covered with the optically transmissive layer 312B. Since the aperture 312Aa is formed in the underlayer 312A for each pixel, the slope surface 312a is formed on the optically transmissive layer 312B in the vicinity of the edge of the aperture of the underlayer 312A. Since the underlayer 312A has the above-mentioned finely rugged portion, the optically transmissive layer 312B has also a finely rugged surface generally conformal to the rugged portion of the underlayer 312A.

As in the fourth embodiment, the reflective layer 313X is formed as shown in FIG. 9(d). The aperture 313h is then formed as shown in FIG. 9(e). The reflective layer 313 is thus completed. The reflective layer 313 has a finely rugged reflective surface generally conformal to the finely rugged surface of the optically transmissive layer 312B. The finely rugged reflective surface scatters visible light.

To form the color filter substrate as the substrate assembly for the liquid-crystal device in accordance with the first embodiment, the color layer 214 illustrated in FIG. 7 is formed for each pixel. The formation process of the color layer remains unchanged from that in the third embodiment.

OTHER EXAMPLES

Other examples applicable to each of the above embodiments are discussed in detail with reference to FIGS. 10(a)–10(d).

Figure 10:
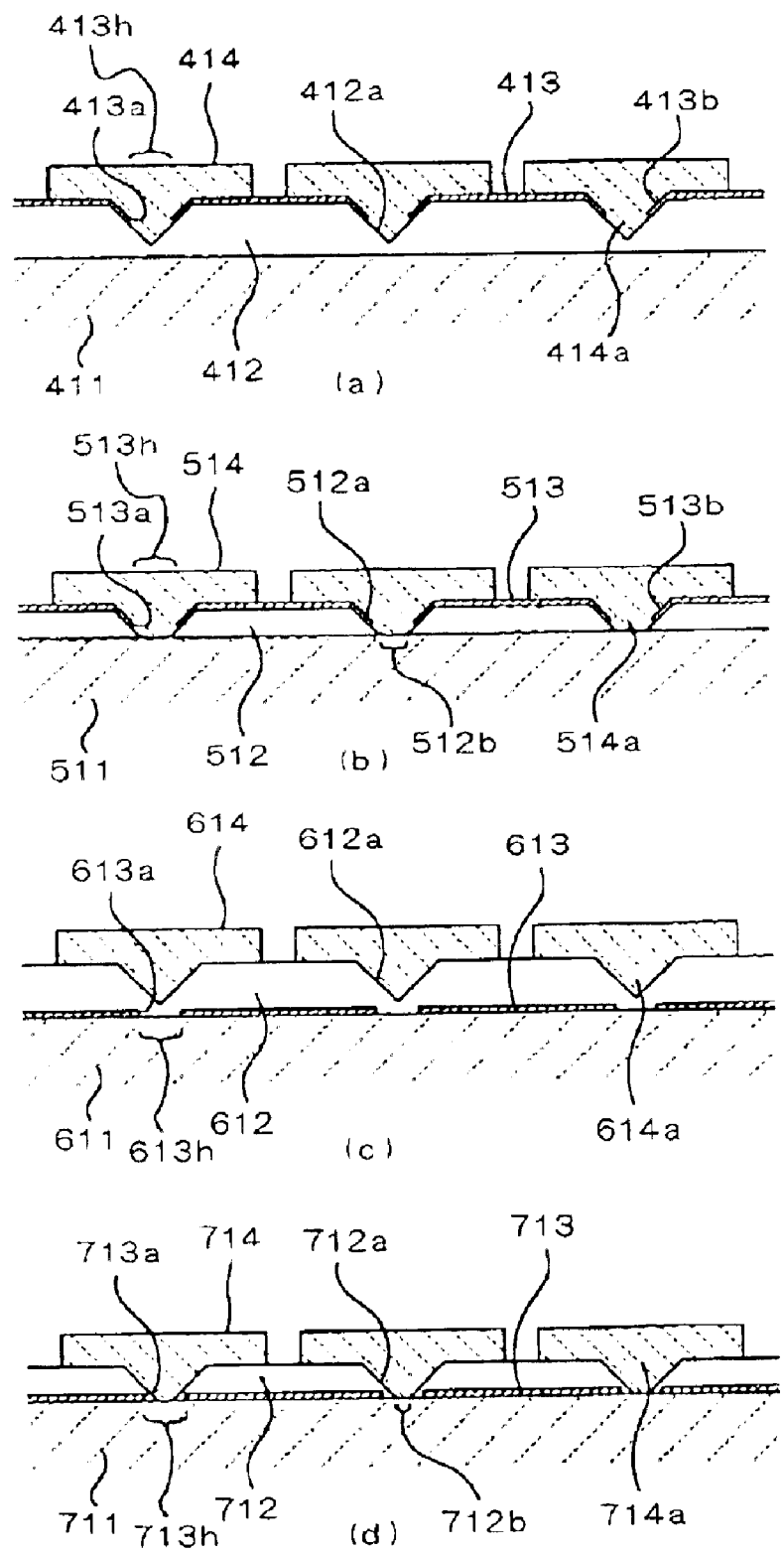
FIGS. 10(a)–10(d) are cross-sectional views diagrammatically illustrating the construction of a substrate assembly for the liquid-crystal device of the present invention.

In an example 1 illustrated in FIG. 10(a), an optically transmissive layer 412 having slope surfaces 412a is formed on a substrate 411, and a reflective layer 413 having edges 413a of apertures on respective slope surfaces 412a is formed on the optically transmissive layer 412. The edge 413a of the aperture is placed on the slope surface 412a, and a color layer 414 is formed on the reflective layer 413. In this general construction, the example 1 remains the same as each of the above-referenced embodiments.

However, the example 1 is still slightly different from each of the above-embodiments in that the bottom edge of the slope surface 412a of the optically transmissive layer 412 is spaced from the surface of the substrate 411. In other words, the optically transmissive layer 412 has still some thickness there. In this case, the optically transmissive layer 412 becomes thicker than the thickness which is required to cause the color layer 414 to form a thick portion 414a having a predetermined increase in thickness. Optically, the example 1 provides the same advantages as those of each of the above-referenced embodiments.

In an example 2 illustrated in FIG. 10(b), an optically transmissive layer 512 having slope surfaces 512a is formed on a substrate 511, and a reflective layer 513 having edges 513a of apertures on respective slopes 512a is formed on the optically transmissive layer 512. The edge 513a of the aperture is arranged on the slope surface 512a, and a color layer 514 is formed on the reflective layer 513. In this general construction, the example 2 remains the same as each of the above-referenced embodiments.

However, the example 2 is slightly different from each of the above-referenced embodiments in that the example 2 includes an aperture 512b having no material of the optically transmissive layer within an area defined by the slope surfaces 512a of the optically transmissive layer 512. Optically, the example 2 provides the same advantages as those of each of the above-referenced embodiments. With the aperture 512b, the thickness of the optically transmissive layer 512 is adjusted in accordance with the size of the aperture of the reflective layer without the need for changing the inclination angle of the slope surface 512a. As already discussed in connection with the first embodiment, the thickness of the optically transmissive layer 512 dictates the relationship between the mean thickness of the thick portion of the color layer 514 and the thickness of the color layer 514 on the flat portion of the reflective layer 513. By adjusting the thickness of the optically transmissive layer 512, the color display characteristics in the reflective-type display and the transmissive-type display are optimized.

In an example 3 illustrated in FIG. 10(c), a reflective layer 613 having apertures 613h is formed on a substrate 611, and an optically transmissive layer 612 is formed on the reflective layer 613. In the same way as described in the above examples, the optically transmissive layer 612 includes slope surfaces 612a. The optically transmissive layer 612 is produced using the same material and the same method as those described in each of the above-referenced embodiments. The color layer 614 is formed on the optically transmissive layer 612. The slope surface 612a of the optically transmissive layer 612 is arranged above the edge 613a of the aperture of the reflective layer 613.

In the example 3, the color layer 614 is arranged on the optically transmissive layer 612 having the slope surfaces 612a, thereby having a thick portion 614a on the slope surface 612a. The thick portion 614a overlaps the aperture 613h in the reflective layer in plan view. Like each of the above-referenced embodiments, the example 3 also increases the chroma in the transmissive-type display while assuring the brightness in the reflective-type display.

In an example 4 illustrated in FIG. 10(d), as in the example 3, a reflective layer 713 having an aperture 713h at each pixel is formed on a substrate 711, and a optically transmissive layer 712 is formed on the reflective layer 713. Apertures 712b are opened in the optically transmissive layer 712. A slope surface 712a is arranged around each aperture 712b. The slope surface 712a of the optically transmissive layer 712 is arranged above the edge 713a of the reflective layer 713.

The example 4 also provides the same advantages as those of the example 3. Furthermore, with the aperture 712b, the thickness of the optically transmissive layer 712 is adjusted in accordance with the size of the aperture of the reflective layer without the need for changing the inclination angle of the slope surface 712a. As already discussed in connection with the first embodiment, the thickness of the optically transmissive layer 712 dictates the relationship between the mean thickness of the thick portion of the color layer 714 and the thickness of the color layer 714 on the flat portion of the reflective layer 713. By adjusting the thickness of the optically transmissive layer 712, the color display characteristics in the reflective-type display and the transmissive-type display are optimized.

In each of the examples 1 through 4, the slope surface is arranged on the optically transmissive layer, and the slope surface is designed to overlap the edge of the aperture of the reflective layer. The transmissive region of the liquid-crystal device is defined by the aperture of the reflective layer, and the aperture of the reflective layer overlaps the thick portion of the color layer on the slope surface of the optically transmissive layer (or on the aperture of the optically transmissive layer, if present). Since the slope surface of the optically transmissive layer or the reflective slope surface of the reflective layer arranged on the slope surface of the optically transmissive layer is present beneath the thick portion of the color layer, the filling of the color material such as a photosensitive color resin is facilitated when the color layer is produced. With the filling of the color material facilitated and the height difference between the top and bottom positions of the optically transmissive layer reduced in the vicinity of the aperture, a dimple is prevented from occurring in the surface of the thick portion or the depth of the dimple is reduced if it occurs there. The flatness of the color layer is thus improved.

In each of the examples 2 and 4, the aperture is opened in the optically transmissive layer as illustrated in FIGS. 10(b) and 10(d), and the slope surface is arranged around the aperture. In this case, it is not necessary that the edge of the aperture of the reflective layer overlaps the slope surface of the optically transmissive layer.

Referring to FIG. 10(b), the edge 513a of the aperture of the reflective layer 513 is arranged on the slope surface 512a of the optically transmissive layer 512 in the example 2 as shown in FIG. 10(b). In modifications illustrates in FIGS. 14(a) and 14(b), the edge of the aperture of the reflective layer is different from that in the example 2.

Figure 14:
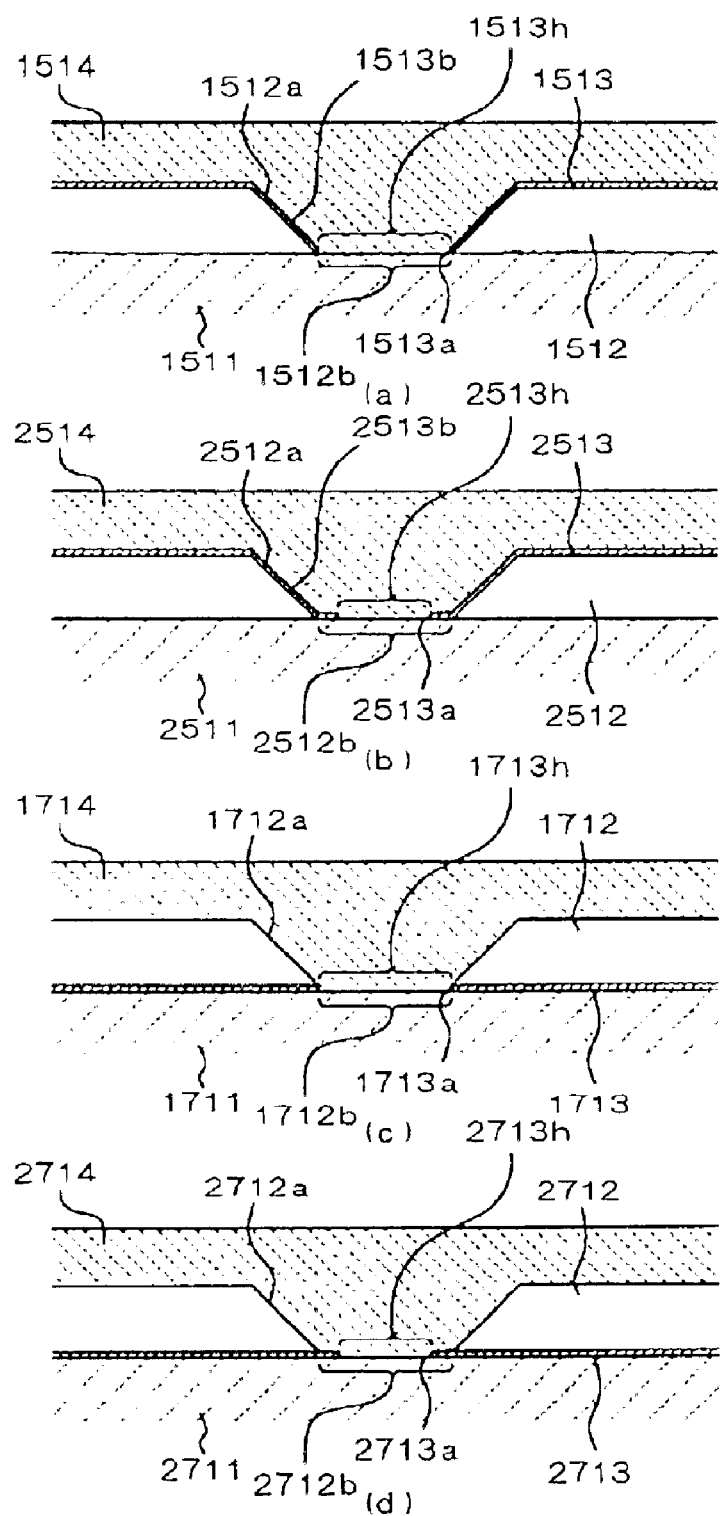
FIGS. 14(a) and 14(b) are enlarged cross-sectional views illustrating modifications of an example 2 in FIG. 10, and FIGS. 14(c) and 14(d) are enlarged cross-sectional views illustrating modifications of an example 4 in FIG. 10.

In the modification illustrated in FIG. 14(a), an optically transmissive layer 1512 is formed on a substrate 1501, and an aperture 1512b is opened in the optically transmissive layer 1512. A slope surface 1512a is formed around the aperture 1512b. A reflective layer 1513 is formed on the optically transmissive layer 1512, and an aperture 1513h is opened in the reflective layer 1513. A color layer 1514 is formed on the reflective layer 1513.

In this modification, the reflective layer 1513 fully covers the slope surface 1512a of the optically transmissive layer 1512, and the edge 1513a of the aperture of the reflective layer 1513 is positioned at substantially the same position as that of the edge of the aperture 1512b of the optically transmissive layer 1512. A portion of the color layer 1514, which is used for the transmissive-type display, is only the area of the aperture 1512b of the optically transmissive layer 1512. The mean thickness of the thick portion of the color layer 1514 in the transmissive region becomes larger than that in the example 2 (is maximized) even if the thicknesses of the layers remain unchanged from those in the example 2. The chroma in the transmissive-type display is thus higher than that in the example 2.

Referring to FIG. 14(b), an optically transmissive layer 2512 is formed on a substrate 2501, and an aperture 2512b is opened in the optically transmissive layer 2512. A slope surface 2512a is formed around the aperture 2512b. A reflective layer 2513 is arranged on the optically transmissive layer 2512, and an aperture 2513h is opened in the reflective layer 2513. A color layer 2514 is arranged on the reflective layer 2513.

In this example, the reflective layer 2513 fully covers the slope surface 2512a of the optically transmissive layer 2512, and the edge 2513a of the aperture of the reflective layer 2513 is inside the aperture 2512b of the optically transmissive layer 2512. The area of the aperture 2512b of the optically transmissive layer 2512 is larger than the area of the aperture 2513h of the reflective layer 2513. A portion of the color layer 2514 available for the transmissive-type display is only the area of the aperture 2513h of the reflective layer 2513 within the aperture 2512b of the optically transmissive layer 2512. The mean thickness of the thick portion of the color layer 2514 in the transmissive region becomes larger than that in the example 2 (is maximized) even if the thicknesses of the layers remain unchanged from those in the example 2. The chroma in the transmissive-type display is thus higher than that in the example 2.

Referring to FIG. 10(d), the slope surface 712a of the optically transmissive layer 712 is arranged above the edge 713a of the aperture of the reflective layer 713 in the example 4. In modifications illustrated in FIGS. 14(c) and 14(d), the position of the edge of the aperture of the reflective layer is different from that in the example 4.

Referring to FIG. 14(c), a reflective layer 1713 having apertures 1713h is arranged on a substrate 1711. An optically transmissive layer 1712 is arranged on the reflective layer 1713. An aperture 1712b is opened in the optically transmissive layer 1712, and a slope surface 1712a is formed around the aperture 1712b. A color layer 1714 is formed on the optically transmissive layer 1712.

In this example, the optically transmissive layer 1712 fully covers the reflective layer 1713, and the edge of the aperture 1712b of the optically transmissive layer 1712 is positioned at substantially the same position as the edge 1713a of the aperture 1713h of the reflective layer 1713. A portion of the color layer 1714 available for the transmissive-type display is only the area of the aperture 1712b of the optically transmissive layer 1712. The mean thickness of the thick portion of the color layer 1714 in the transmissive region becomes larger than that in the example 4 (is maximized) even if the thicknesses of the layers remain unchanged from those in the example 4. The chroma in the transmissive-type display is thus higher than that in the example 4.

A reflective layer 2713 having an aperture 2713h is formed on a substrate 2711 in the modification referring to FIG. 14(d). An optically transmissive layer 2712 is then formed on the reflective layer 2713. An aperture 2712b is opened in the optically transmissive layer 2712, and a slope surface 2712a is formed around the aperture 2712b. A color layer 2714 is arranged on the optically transmissive layer 2712.

In this modification, the optically transmissive layer 2712 fully covers the reflective layer 2713, and the edge 2713a of the aperture of the reflective layer 2713 is within the aperture 2712b of the optically transmissive layer 2712. The area of the aperture 2712b of the optically transmissive layer 2712 is larger than the area of the aperture 2713h of the reflective layer 2713. A portion of the color layer 2714 available for the transmissive-type display is only the area of the aperture 2713h of the reflective layer 2713 within the aperture 2712b of the optically transmissive layer 2712. The mean thickness of the thick portion of the color layer 2714 in the transmissive region becomes larger than that in the example 4 (is maximized) even if the thicknesses of the layers remain unchanged from those in the example 4. The chroma in the transmissive-type display is thus higher than that in the example 4.

In accordance with the present invention, the optical characteristics of the color layer is changed depending on where the edge of the aperture of the reflective layer is positioned with respect to the slope surface or the aperture of the optically transmissive layer. For example, if the edge of the aperture of the reflective layer is changed in position within a range that allows the edge to overlap the slope surface, the mean thickness of the color layer contributing to the transmissive-type display is varied. When the shape and area of the aperture of the reflective layer are set to be fixed, the thickness of the color layer used for the transmissive-type display is virtually adjusted by adjusting the position of the slope surface of the optically transmissive layer. The chroma in the transmissive-type display is thus adjusted.

Figure 11:
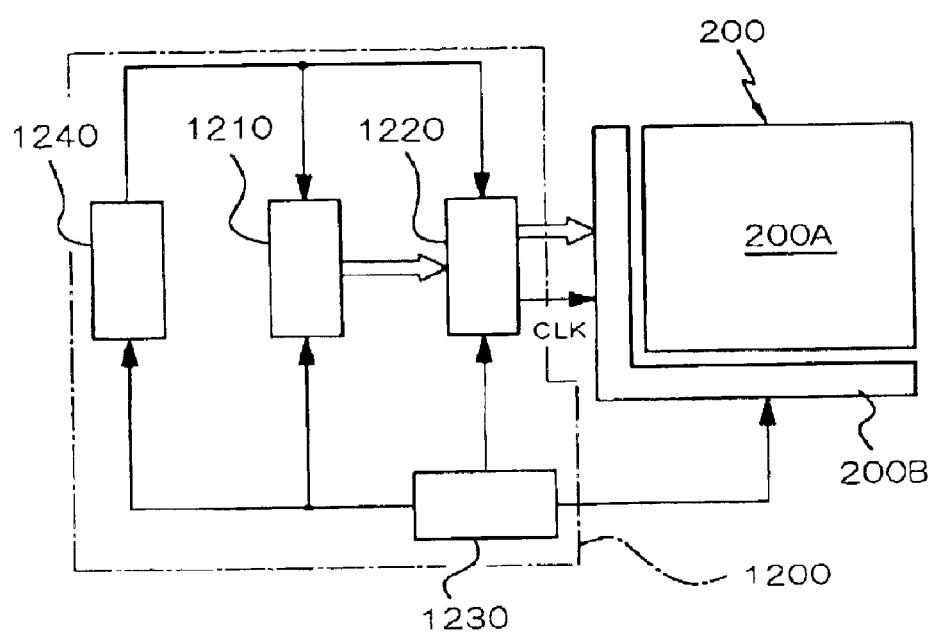
FIG. 11 is a block diagram diagrammatically illustrating one embodiment of electronic apparatus of the present invention.

The embodiments of electronic apparatus which use, as the display device thereof, the liquid-crystal device including the above-referenced liquid-crystal panel is now discussed. FIG. 11 is a block diagram illustrating the general construction of this embodiment. The electronic apparatus here includes a liquid-crystal panel 200, and control means 1200 for controlling the liquid-crystal panel 200. The liquid-crystal panel 200 includes a panel structure 200A and a driving circuit 200B formed of semiconductor ICs. The control means 1200 includes a display information output source 1210, a display processing circuit 1220, a power source circuit 1230, and a timing generator 1240.

The display information output source 1210 includes a memory such as a ROM (Read-Only Memory) or a RAM (Random Access Memory), a storage unit including a magnetic storage disk or an optical store disk, and a tuning circuit for tuning to and outputting a digital video signal. Video information is fed to the display processing circuit 1220 in the form of video signal in a predetermined format in response to a variety of clock signals generated by the timing generator 1240.

The display information processing circuit 1220 includes a variety of known processing circuits such as a serial-to-parallel converter circuit, an amplifier and polarity reversal circuit, a rotation circuit, a gamma correction circuit, and a clamp circuit, and processes input video information, and then feeds resulting information together with a clock signal CLK to the driving circuit 200B. The driving circuit 200B includes a scanning-line driving circuit, a data-line driving circuit, and a test circuit. The power source circuit 1230 feeds predetermined voltages to the above blocks.

Figure 12:
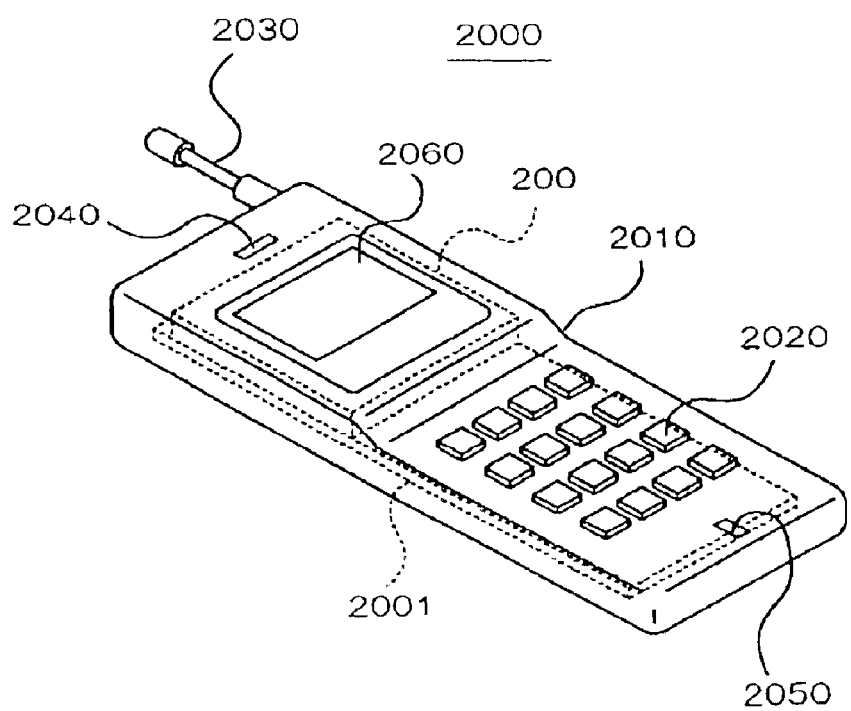
FIG. 12 is a perspective view illustrating the external appearance of a mobile telephone as one embodiment of the electronic apparatus.

FIG. 12 illustrates a mobile telephone as one embodiment of the electronic apparatus of the present invention. The mobile telephone 2000 includes a circuit board 2001 inside a case 2010. The above-referenced liquid-crystal panel 200 is mounted on the circuit board 2001. Operation buttons 2020 are arranged on the front of the case 2010. A collapsible antenna 2030 is mounted on one end of the case 2010. A loudspeaker is housed in a receiver section 2040, and a microphone is housed in a transmitter section 2050.

The user views a display screen (the display area A of the liquid-crystal display) through a window 2060 in the liquid-crystal panel 200 housed in the case 2010.

The electrooptical device and the electronic apparatus of the present invention are not limited to the above examples illustrated in the drawings. A variety of changes may be possible without departing from the scope of the present invention. For example, the liquid-crystal panel of each of the above-referenced embodiments has a passive-matrix structure. The present invention is applied to an active-matrix liquid-crystal device which uses an active element such as a TFT (Thin-Film Transistor) or a TFD (Thin-Film Diode). The liquid-crystal panel of each of the above-referenced embodiments has a COG-type structure. The present invention is applied to a liquid-crystal panel having no IC chips directly mounted thereon, for example, a liquid-crystal panel having a flexible wiring board or a TAB board connected thereto.

The above-referenced embodiments are related to the substrate assembly for the liquid-crystal device, and the liquid-crystal device. The present invention is applied to a variety of substrate assemblies for electrooptical devices, and the electrooptical devices including an organic electroluminescent device, a plasma display device, a field-emission display device.

In accordance with the present invention as described above, the reflective layer is easily and precisely patterned by forming the reflective layer having the aperture on the optically transmissive layer having the slope surface.

The viewing angle of the electrooptical device is increased by arranging the reflective slope surface of the reflective layer on the slope surface.

With the color layer arranged on the above structure, the chroma in the transmissive-type display is increased while the brightness in the reflective-type display is maintained. The difference in chroma between the reflective-type display and the transmissive-type display is reduced.

The entire disclosure of Japanese Patent Application Nos. 2001-228448 filed Jul. 27, 2001 and 2002-188599 filed Jun. 27, 2002 are expressly incorporated by reference.

What is claimed is:

1. A substrate assembly for an electrooptical device, comprising:
a substrate;
an optically transmissive layer disposed over the substrate, the optically transmissive layer having a slope surface inclined with respect to the substrate, and substantially transmits light;
a reflective layer, disposed on the optically transmissive layer, and having an aperture with an edge; and
a color layer disposed over the slope surface and on the reflective layer;
wherein the edge of the aperture overlaps the slope surface.

2. A substrate assembly for an electrooptical device according to claim 1, wherein the optically transmissive layer comprises a valley portion formed of the slope surface.

3. A substrate assembly for an electrooptical device according to claim 1, wherein the reflective layer comprises a reflective slope surface inclined with respect to the substrate, and the reflective slope surface is arranged at least on the slope surface of the optically transmissive layer.

4. A substrate assembly for an electrooptical device according to claim 1, wherein the reflective layer comprises a finely rugged portion for scattering visible light.

5. A substrate assembly for an electrooptical device according to claim 1, wherein an upper surface of the color layer is flat.

6. A substrate assembly for an electrooptical device according to claim 1, wherein an inclination angle of the slope surface is within a range of 68 to 79 degrees with respect to the substrate.

7. A substrate assembly for an electrooptical device, comprising:
a substrate;
an optically transmissive layer disposed over the substrate, the optically transmissive layer having an aperture, and substantially transmits light;
a reflective layer having an aperture with an edge overlapping the aperture of the optically transmissive layer; and
a color layer disposed over the optically transmissive layer and within the aperture of the optically transmissive layer;
wherein the optically transmissive layer has a slope surface, inclined with respect to the substrate, around the aperture thereof; and
wherein the edge of the aperture of the reflective layer overlaps the slope surface or within the aperture of the optically transmissive layer.

8. A substrate assembly for an electrooptical device according to claim 3, wherein the optically transmissive layer comprises a surface parallel with the substrate, and the reflective slope surface of the reflective layer extends over the slope surface of the optically transmissive layer from the parallel surface thereof.

9. A substrate assembly for an electrooptical device, comprising:
a substrate;
a reflective layer disposed on the substrate, and having an aperture with an edge;
an optically transmissive layer disposed on the reflective layer, the optically transmissive layer having a slope surface inclined with respect to the substrate, and substantially transmits light; and
a color layer disposed on the slope surface and over the reflective layer;
wherein the slope surface overlaps the edge of the aperture.

10. A substrate assembly for an electrooptical device, comprising:
a substrate;
a reflective layer disposed on the substrate, and having an aperture with an edge;
an optically transmissive layer disposed on the reflective layer, the optically transmissive layer having an aperture overlapping the aperture of the reflective layer, and substantially transmits light; and
a color layer disposed on the optically transmissive layer and within the aperture of the optically transmissive layer;
wherein the optically transmissive layer comprises a slope surface, inclined with respect to the substrate, around the aperture thereof and
wherein the edge of the aperture of the reflective layer overlaps the slope surface or within the aperture of the optically transmissive layer.

11. An electrooptical device comprising:
a substrate;
an optically transmissive layer disposed over the substrate, the optically transmissive layer having a slope surface inclined with respect to the substrate, and substantially transmits light; and
a reflective layer disposed on the optically transmissive layer, and having an aperture with an edge; and
a color layer disposed over the slope surface and on the reflective layer;
wherein the edge of the aperture is placed on the slope surface.

12. Electronic apparatus comprising an electrooptical device according to claim 11 and control means for controlling the electrooptical device.

13. An electrooptical device comprising:
a substrate;
an optically transmissive layer disposed over the substrate, the optically transmissive layer having an aperture, and substantially transmits light;
a reflective layer having an aperture with an edge overlapping the aperture of the optically transmissive layer; and a color layer disposed over the optically transmissive layer and within the aperture of the optically transmissive layer;

wherein the optically transmissive layer has a slope surface, inclined with respect to the substrate, around the aperture thereof; and wherein the edge of the aperture of the reflective layer overlaps the slope surface or within the aperture of the optically transmissive layer.

14. An electrooptical device comprising:

a substrate;

a reflective layer disposed on the substrate, and having an aperture with an edge;

an optically transmissive layer disposed on the reflective layer, the optically transmissive layer having a slope surface inclined with respect to the substrate, and substantially transmits light; and a color layer disposed on the slope surface and over the reflective layer;

wherein the slope surface overlaps the edge of the aperture.

15. An electrooptical device comprising:

a substrate;

a reflective layer disposed on the substrate, and having an aperture with an edge;

an optically transmissive layer disposed on the reflective layer, the optically transmissive layer having an aperture ovelapping the aperture of the reflective layer, and substantially transmits light; and a color layer disposed on the optically transmissive layer and within the aperture of the optically transmissive layer;

wherein the optically transmissive layer comprises a slope surface, inclined with respect to the substrate, around the aperture thereof; and wherein the edge of the aperture of the reflective layer overlaps the slope surface or within the aperture of the optically transmissive layer.

16. A substrate assembly for an electrooptical device, comprising:

a substrate including a transmissive region and a reflecting region;

an optically transmissive layer disposed over the substrate, the optically transmissive layer having a slope surface inclined with respect to the substrate, and substantially transmits light;

a reflective layer disposed on the optically transmissive layer in the reflecting region and on at least of a part of the slope surface of the optically transmissive layer, and having an aperture located in correspondence with the transmissive region surrounded by the slope surface; and a color layer disposed on the reflective layer and within the aperture.

17. An electrooptical device comprising:

a substrate including a transmissive region and a reflecting region, an optically transmissive layer disposed over the substrate, the optically transmissive layer having a slope surface inclined with respect to the substrate, and substantially transmits light;

a reflective layer disposed on the optically transmissive layer in the reflecting region and on at least of a part of the slope surface of the optically transmissive layer, and having an aperture located in correspondence with the transmissive region surrounded by the slope surface; and a color layer disposed on the reflective layer and within the aperture.

* * * * *